(12) United States Patent
Klein et al.

(10) Patent No.: US 12,454,329 B2
(45) Date of Patent: Oct. 28, 2025

(54) DRIVE SYSTEM AND REMOTE CONTROL

(71) Applicant: GATES CORPORATION, Denver, CO (US)

(72) Inventors: Jan Klein, Tampere (FI); Iiro Peltola, Tampere (FI)

(73) Assignee: Gates Corporation, Denver, CO (US)

( * ) Notice: Subject to any disclaimer, the term of this patent is extended or adjusted under 35 U.S.C. 154(b) by 1004 days.

(21) Appl. No.: 17/595,857

(22) PCT Filed: May 29, 2020

(86) PCT No.: PCT/FI2020/050364
§ 371 (c)(1),
(2) Date: Nov. 29, 2021

(87) PCT Pub. No.: WO2020/240094
PCT Pub. Date: Dec. 3, 2020

(65) Prior Publication Data
US 2022/0234677 A1    Jul. 28, 2022

(30) Foreign Application Priority Data
May 31, 2019    (FI) .................................... 20195463

(51) Int. Cl.
*B62M 6/45*    (2010.01)
*B62K 23/02*    (2006.01)
(Continued)

(52) U.S. Cl.
CPC ............... *B62K 23/02* (2013.01); *B62M 6/45* (2013.01); *B62M 6/55* (2013.01); *B62M 11/14* (2013.01);
(Continued)

(58) Field of Classification Search
CPC ....... B60Y 2200/13; B62M 6/45; B62M 6/55; B62M 11/14; B62M 25/08; F16H 3/725;
(Continued)

(56) References Cited

U.S. PATENT DOCUMENTS 8,876,657 B1    11/2014  Behbehani
2012/0253600 A1    10/2012  Ichida et al.
(Continued)

FOREIGN PATENT DOCUMENTS

EP    2505469 A1    10/2012
EP    2767467 A1    8/2014

OTHER PUBLICATIONS

International Search Report issued by the Finnish Patent and Registration Office acting as the International Searching Authority in relation to International Application No. PCT/FI2020/050364 dated Oct. 8, 2020 (5 pages).
(Continued)

*Primary Examiner* — Lori Wu
(74) *Attorney, Agent, or Firm* — Kevin J. Aiken, Esq.

(57) ABSTRACT

A drive system and remote control for a light electric vehicle. The drive system includes a power unit, a main gearing connected to the power unit and a remote control connect to the power unit. The power unit includes an assist motor arranged to provide torque output to a torsion shaft of the light electric vehicle, and a control motor arranged to adjust transmission ration of the main gearing. The remote control further includes an operating switch arranged to switch the remote control between a first and a second operating state for controlling the assist motor and control motor, respectively.

8 Claims, 17 Drawing Sheets

(51) Int. Cl.
*B62M 6/55* (2010.01)
*B62M 11/14* (2006.01)
*B62M 25/08* (2006.01)
*F16H 3/72* (2006.01)
*F16H 59/04* (2006.01)
*F16H 61/686* (2006.01)
*G08C 17/02* (2006.01)
*G08C 19/00* (2006.01)

(52) U.S. Cl.
CPC ............. *B62M 25/08* (2013.01); *F16H 3/725* (2013.01); *F16H 59/044* (2013.01); *F16H 61/686* (2013.01); *G08C 17/02* (2013.01); *G08C 19/00* (2013.01); *G08C 2201/30* (2013.01)

(58) Field of Classification Search
CPC .......... F16H 3/724; F16H 3/72; F16H 59/044; F16H 59/02; F16H 61/686; F16H 37/065; G08C 17/02; G08C 17/00; G08C 19/00; G08C 2201/30; B62K 23/02; B62K 1/02
See application file for complete search history.

(56) References Cited

U.S. PATENT DOCUMENTS

| | | | |
|---|---|---|---|
| 2014/0235383 A1* | 8/2014 | Wesling | B62M 25/08 474/80 |
| 2018/0251180 A1 | 9/2018 | Durdevic et al. | |
| 2019/0127024 A1 | 5/2019 | Hoppach | |
| 2019/0162275 A1 | 5/2019 | Hawkins | |
| 2020/0180728 A1* | 6/2020 | Ohashi | B62J 43/13 |

OTHER PUBLICATIONS

Written Opinion of the International Searching Authority issued by the Finnish Patent and Registration Office acting as the International Searching Authority in relation to International Application No. PCT/FI2020/050364 dated Oct. 8, 2020 (8 pages).

Finnish Search Report issued by the Finnish Patent and Registration Office in relation to Finnish Application No. 20195463 dated Nov. 19, 2019 (1 page).

* cited by examiner

DRIVE SYSTEM AND REMOTE CONTROL

CROSS-REFERENCE TO RELATED APPLICATIONS

This application is a National Phase Entry under 35 U.S.C. 371 of PCT International Application No. PCT/FI2020/050364 filed May 29, 2020, which claims priority to Finnish Patent Application No. 20195463, filed May 31, 2019, the disclosure of each of these applications is expressly incorporated herein by reference in their entirety.

FIELD OF THE INVENTION

The present invention relates to a drive system and more particularly to drive system for a light electric vehicle. The present invention also relates to a remote control and more particularly to a remote control for a light electric vehicle.

BACKGROUND OF THE INVENTION

In the prior art, light electric vehicles comprise a power unit with a first motor which is arranged to provide torque to a crankshaft of the light electric vehicle. The first motor, and thus the power output and the speed, of the light electric vehicle is usually controlled with a first remote control. The first remote control may be arranged to a handle bar of the light electric vehicle so that the user may operate the first motor with the first remote control during driving or riding the light electric vehicle. In many light electric vehicles, the power unit further comprise second motor arranged to adjust transmission ratio. Thus, the drive system may also comprise main gearing, such as an epicyclic gear set connected between the first motor and the crankshaft. The second motor is arranged to adjust the transmission ratio of the main gearing, or the epicyclic gear set. The drive system then comprises also a second remote control arranged to control the second motor and thus the transmission ratio between the first motor and the crankshaft. The second remote control is also provided to the handle bar to be operated by a user during driving or riding the light electric vehicle. The first and second remote controls are arranged separate from each other, for example on right and left handle bar portion, respectively.

One of the problems associated with the prior art is that the remote controls provide a complicated system which is difficult to use. The two remote controls also require two hands such that the user may operate both motors of the power unit. The prior art remote controls further require multibutton interactions in order to activate the mentioned control functions or does not allow simultaneous control of different operating states.

BRIEF DESCRIPTION OF THE INVENTION

An object of the present invention is to provide a drive system and remote control so as to overcome or at least alleviate the prior art disadvantages.

The preferred embodiments of the invention are disclosed in the dependent claims.

The invention is based on the idea of providing drive system for a light electric vehicle. Light electric vehicles are electric vehicles with two or four wheels powered by a battery, fuel cell, or hybrid-powered, and generally weighing less than 100 kilograms. Examples of light electric vehicles comprise electric bicycles and electric kick scooters. The drive system comprises a power unit for driving light electric vehicle, a main gearing connected to the power unit for controlling transmission ratio of the power unit and a remote control connected to the power unit for operating the power unit. The remote control may be a handlebar remote control provided in connection with or attached to the handlebar of the light electric vehicle. The remote control comprises an actuator arranged to operate the power unit. The power unit comprises an assist motor arranged to provide torque output to a torsion shaft of the light electric vehicle, and a control motor arranged to adjust transmission ratio of the main gearing. Accordingly, the assist motor is arranged output power to the torsion shaft or increase rotational speed of the torsion shaft. The control motor on the other hand is arranged to adjust the power transmission ratio, or gearing, between the assist motor and the torsion shaft. In the present invention, the remote control comprises an operating switch arranged to switch the remote control between a first operating state and a second operating state. In the first operating state the actuator is connected to the assist motor and arranged to adjust the torque output of the assist motor. In the second operating state the actuator is connected to the control motor and arranged to adjust the transmission ratio main gearing.

Therefore, in the present invention the same actuator of the remote control may be utilized to control the operation of the assist motor and the control motor, or the torque output from the assist motor to the torsion shaft and the power transmission of the main gearing. The operating switch of the remote control is operable to switch the remote control to the first operating state in which the actuator is operable to adjust the assist motor, and to switch the remote control to the second operating state in which the actuator is operable to adjust the control motor.

Thus, operating the power unit is simpler and the remote control may be operated with one hand. Further, one remote control takes less space in the handle bar of the light electric vehicle.

Thus, the operating switch is used to optionally connect the control unit or the actuator or actuator element operatively or directly to the assist motor or to the control motor. In this application, connecting the control unit or the actuator or actuator element operatively also comprises that the control unit may be arranged or configured to the generate first and second type of control signals respectively in the first and second operating state. In the first operating state the control unit is configured or arranged to generate first type control signals configured to control the assist motor. Similarly, in the second operating state the control unit is configured or arranged to generate second type control signals configured to control the control motor.

In one embodiment, the operating switch may have two functions. The first function is switching between the first and second operating state. The second function may be to operate the power or torque value outputted by the assist motor. The second function is operable despite in which operating state the remote control is.

Accordingly, the first and second function may be separate from each other by different actuation manners of the operating switch. For example, long press or long actuation time of the operating switch is configured to provide the first function and change the operating state of the remote control between the first and second operating states. Similarly, a short press or actuation time of the operating switch is configured to provide the second function an adjust the power or torque value outputted by the assist motor.

In one embodiment of the present invention, the remote control is wirelessly connected to the power unit. The wireless connection enables easy installation of the remote control and also the location of the remote control in the light electric vehicle or in the handle bar may be chosen freely.

In another embodiment, the remote control is connected to the power unit with a communication line. The communication line provides secure and reliable communication connection between the remote control and the power unit.

In one embodiment, the remote control comprises a control unit connected to the actuator and arranged to provide control signals as response to actuation of the actuator. The control unit comprises components configured to generate the control signals and transmitting the control signals to the power unit. Further, the control unit comprises components configured to receive actuation signals from the actuator or detect actuation of the actuator. Further, the control unit comprises components configured to generate the control signal(s) as response to the receiving the actuation signals from the actuator or detect actuation of the actuator.

In one embodiment, the actuator of the remote control comprises a mechanical actuator element for actuating the actuator. The mechanical actuator may comprise one or more levers, buttons, triggers or twist shifters, or the like mechanical actuator elements. Mechanical actuator elements may robust and reliable in outdoor environments when subjected to moisture, dirt and rough handling. Further, the mechanical actuator elements may provide sense for user upon operating the remote control such that the user realises when the actuator is effectively actuated. The mechanical actuator elements may provide mechanical movement in the remote control upon actuation of the actuator element. The control unit is arranged to detect the actuation of the mechanical actuator element or the mechanical movement provided by actuator element.

In another embodiment, the actuator comprises electronic actuator element for actuating the actuator. The electronic actuator element may comprise capacitive pushbuttons or resistive pushbuttons. The electronic actuator elements provide easy use in difficult situation when the user is occupied in driving. The electronic actuator further provides minimal physical force for operating the remote control. The electronic actuator element generates an actuation signal upon actuation and may transmit the actuation signal to the control unit of the remote control. The control unit is arranged to detect or receive the actuation signal from the electronic actuation element and to generate the control signal(s) as response to the receiving the actuation signals from the electronic actuator element.

In one embodiment, the remote control comprises a main body provided with the control unit and the actuator is connected or provided to the main body. Accordingly, this embodiment provides single unit remote control in which both the control unit and the actuators are provided to the same unit, meaning the main body. This provides a simple structure and design. Further, the single unit enables making the remote control waterproof in a simple manner.

In another embodiment, the remote control comprises a main body provided with the control unit and a separate actuator body connected to the main body. In this embodiment, the remote control comprises to parts: the main body and the separate actuator body. The main body comprises the control unit, meaning the components for generating and transmitting the control signals to the power unit. The separate actuator body comprises the actuator or actuator elements which the user operates for controlling the power unit. This structure enables optimizing the main body and design thereof for the control unit, for example waterproof and rigid structures for protecting the control unit and components thereof. Similarly, the separate actuator body and the design thereof may be optimized for the actuator elements, for example robustness, without need for taking into account the limitations caused by the control unit.

In a further embodiment, the remote control comprises a main body provided with the control unit and a separate actuator body detachably connected to the main body. The detachable structure enables changing or replacing or customizing the separate actuator body while maintaining the main body the same or uninstalled from the light electric vehicle. Further, the same main body may be used for different separate actuator bodies and/or different actuator elements. This makes the remote control easy to repair and thus the is the separate actuator part may be chosen or replaced as desired or when damaged without need to repair or replace the whole remote control. Detachable in the context of this application means that separate actuator body and the main body may be detached from each other without breaking the remote control and preferably with ease such that the remote control needs not to be disassembled.

In one embodiment, the actuator element is provided to the separate actuator body, and the operating switch is provided to the main body. In this embodiment, the operating state remote control is switched with the operating switch which is in the main body.

In another embodiment, the actuator element is provided to the separate actuator body, and the operating switch and the control unit are provided to the main body. Accordingly, the operating switch is provided to the main body together with the control unit and connected to the control unit. This enables providing the components for generating the control signal to the main body, and thus the separate actuator body may be provided with simple structure.

When the operating switch is provided to the main body, the control unit may be arranged or configured to be switched to the first and second operating state, and/or the control unit may be switched to generate the first and second type control signals.

In a further embodiment, the actuator element is provided to the separate actuator body, and the operating switch is provided to the separate actuator body. In this embodiment, the operating switch may be provided in connection with the actuator element(s) or connected to the actuator element(s).

In a yet alternative embodiment, the actuator element and the operating switch are provided to the separate actuator body, and the control unit 55 is provided to the main body.

When the operating switch is provided to the separate actuator body, the actuator or the actuator element(s) may be switched to the first and second operating state, and/or the actuator may provide a first and second type actuation signal or mechanical actuation movement for generating the control signals in the control unit based on the first and second operating state.

In one embodiment, the operating switch comprises a first mode position in which the remote control is in the first operating state, and a second mode position in which the remote control is in the second operating state. In this embodiment, the operating switch may comprise one switching element and/or switching button or switching component which may be operated to arrange the operating switch to the first and second mode position. One switching component may provide compact structure for the remote control.

Instead of two first and second mode positions, the operating switch is configured as reverting switch which reverts to initial positions after pressing or actuating the operating switch. This is especially advantageous when the operating switch has the two functions based on actuation manner of the operating switch In another embodiment, the operating switch comprises a first switching element arranged to switch the operating switch in a first mode position in which the remote control is in the first operating state, and a second switch element arranged to switch the operating switch in a second mode position in which the remote control is in the second operating state. In this embodiment, the operating switch may comprise two switching elements or switching buttons and/or switching components which may be operated to arrange the operating switch to the first and second mode position. Two separate switching elements helps the user to set the desired operating state for the remote control.

In one embodiment, the operating switch comprises a mechanical operating switch. Accordingly, the mechanical operating switch is arranged to switch the remote control between the first and second operating states.

In another embodiment, the operating switch is a mechanical switch comprising one or more actuator arms and one or more switching components provided to the main body. Accordingly, operating or actuating the operating switch or switching element causes the actuator arm(s) to move relative to the switching component(s) and set the switching component(s) or the operating switch from the first operating mode position to the second operating mode position, or vice versa.

In a further embodiment, the operating switch comprises an electronic operating switch. Accordingly, the electronic operating switch is arranged to switch the remote control between the first and second operating states.

In a yet further embodiment, the operating switch comprises an electronic operating switch comprising one or more actuation sensors and one or more electronic or magnetic actuator emitters. Accordingly, actuating or operating the operating switch or the switching element causes the actuator receiver to detect the actuation via the actuator emitter and set the switching component(s) or the operating switch from the first operating mode position to the second operating mode position, or vice versa.

In one embodiment, the main gearing comprises an epicyclic gear set comprising a sun gear, a ring gear, plurality of planet gears between the sun gear and the ring gear and a planet carrier connected to the planet gears and arranged to receive rotation of a torsion shaft. The control motor is connected to the ring gear of the epicyclic gear set, the torsion shaft is connected to the sun gear of the epicyclic gear set, and the assist motor is connected to the sun gear of the epicyclic gear set.

In another embodiment, the control motor is connected to the sun gear of the main epicyclic gear set, the torsion shaft is connected to the planet carrier of the epicyclic gear set, and the assist motor is connected to the ring gear of the epicyclic gear set.

The present invention also relates to a remote control for a light electrical vehicle. The remote control comprises a main body and an actuator provided in connection with the main body for operating the remote control. According to the present invention, the remote control comprises an operating switch. The operating switch is connected to the actuator. The remote control being provided with a first operating state in which the actuator is arranged to provide a first type control signal, and a second operating state in which the actuator is arranged to provide a second type control signal. The operating switch is arranged to switch the remote control between the first operating state and the second operating state. The remote control is arranged to operate a power unit of the light electric vehicle. Thus, the remote control may be connected to the power unit.

Accordingly, in the present invention, the operating switch is provided to the remote control and configured to set the actuator and/or the remote control to the first operating state in which the remote control is configured to generate the first type control signal in response to actuation of the actuator, and to the second operating state in which the remote control is configured to generate the second type control signal in response to actuation of the actuator. Therefore, the same actuator may be used for generating two different types of control signals depending on the operating state provided by the operating switch.

In one embodiment, the remote control comprises a control unit arranged to generate the first and second type control signals as response to actuating the actuator. The control unit comprises components configured to generate the control signals and transmitting the control signals to the power unit. Further, the control unit comprises components configured to receive actuation signals from the actuator or detect actuation of the actuator. Further, the control unit comprises components configured to generate the control signal(s) as response to the receiving the actuation signals from the actuator or detect actuation of the actuator.

In one embodiment, the actuator is provided to the main body of the remote control. In this embodiment, the actuator may form part of the main body or it may be secured or integrated to the main body. Thus, a single unit and compact remote control is formed. The single unit remote control for two operating states may be formed waterproof as there are no separate parts.

In one embodiment, the remote control comprises a separate actuator body connected to the main body. In this embodiment, the remote control comprises at least two parts, meaning the main body and the separate actuator body. The actuator body is connected or attached to the main body. Thus, the same main body used for different kinds of separate actuator bodies.

In another embodiment, the remote control comprises a separate actuator body detachably connected to the main body. The separate actuator body may be detached without breaking or disassembling the remote control. Thus, the separate actuator body and the main body may be attached to each other with a quick-connect fitting, threads, screws, snap lock mechanism or the like mechanism allowing detaching the separate actuator body from the main body. Thus, the separate actuator body may be replaced or changed easily when needed.

In one embodiment, the main body comprises a main body recess and the separate actuator body comprises an insert portion. The insert portion is arranged into the main body recess for connecting the separate actuator body to the main body. Accordingly, the separate actuator body is arranged at least partly inside the main body for connecting the separate actuator body and the main body together. The connecting surfaces of the main body and the separate actuator body may be arranged inside the main body and thus protected from the environmental conditions.

In another embodiment, the separate actuator body comprises an actuator body recess. At least part of the main body is arranged into the actuator body recess for connecting the separate actuator body to the main body. Accordingly, in this embodiment the main body is arranged at least partly inside the separate actuator body for connecting the separate actuator body and the main body together. The main body may be protected by the separate actuator body as at least part of the main body is inside the separate actuator body.

In a further embodiment, the remote control comprises a locking mechanism arranged to connect the main body and the separate actuator body together. Accordingly, the main body and the separate actuator body may be attached together with the locking mechanism. Thus, the locking mechanism may be utilized to secure main body and the actuator body detachably together.

In one embodiment, the actuator is provided to the separate actuator body and the operating switch is provided to the main body. Accordingly, the separate actuator body comprises only the actuator.

In another embodiment, the actuator is provided to the separate actuator body, and the operating switch and the control unit are provided to the main body. This enables providing the components for generating the control signal to the main body, and thus the separate actuator body may be provided with simple structure.

When the operating switch is provided to the main body, the control unit may be arranged or configured to be switched to the first and second operating state, and/or the control unit may be switched to generate the first and second type control signals.

In an alternative embodiment, the actuator is provided to the separate actuator body, and also the operating switch is provided to the separate actuator body.

In a further embodiment, the actuator and the operating switch are provided to the separate actuator body, and the control unit is provided to the main body. When the operating switch is provided to the separate actuator body, the actuator or the actuator element(s) may be switched to the first and second operating state, and/or the actuator may provide a first and second type actuation signal or mechanical actuation movement for generating the control signals in the control unit based on the first and second operating state.

In one embodiment, the actuator comprises a mechanical actuator element arranged to operate the remote control for generating the first type and second type control signals. The mechanical actuator element may comprise one or more levers, buttons, triggers or twist shifters, or the like mechanical actuator elements.

In another embodiment, the actuator comprises an electronic actuator element arranged to operate the remote control for generating the first type and second type control signals. The electronic actuator element may comprise for example capacitive pushbuttons or resistive pushbuttons.

In one embodiment, the remote control comprises one or more electronic actuator switches arranged detect actuation of the actuator. The electronic or magnetic actuator switch may provide an actuation signal to the control unit for generating the control signals. The magnetic or electronic actuator switch may also enable good waterproof structure for the remote control. The actuator switch is connected to the actuator(s) or the actuator elements. Further, the actuator switch is connected to the control unit. Thus, the actuator switch is connected between the actuators or the actuator elements and the control unit.

In another embodiment, the remote control comprises one or more electronic actuator switches arranged to detect actuation of the actuator. The actuator switch comprises one or more actuator sensors provided to the main body and one or more electronic or magnetic actuator emitters provided to the separate actuator body. Accordingly, the actuator sensor is arranged to detect movement of the actuator emitter as response to actuating the actuators. Thus, the actuation of the actuator may be detected in contactless manner.

Therefore, in one embodiment, the remote control comprises one or more electronic actuator switches arranged to detect actuation of the actuator, and the electronic actuator switch is a Hall switch or a capacitive switch.

In one embodiment, the remote control comprises one or more mechanical actuator switches arranged to detect actuation of the actuator. The mechanical actuator switch may be operated with the movement of the actuators when the actuators are actuated by the user. This may provide robust and reliable actuator switch.

In one embodiment, the remote control comprises one or more mechanical actuator switches arranged to detect actuation of the actuator. The one or more mechanical actuator switches comprise one or more actuator arms provided to the separate actuator body and one or more switching components provided to the main body. Accordingly, actuating the actuator may cause the actuator arm to operate the switching component as a response to movement of the actuator. The actuator switch is connected to the actuator(s) or the actuator elements. Further, the actuator switch is connected to the control unit. Thus, the actuator switch is connected between the actuators or the actuator elements and the control unit.

In one embodiment, the remote control comprises one or more mechanical actuator switches arranged to detect actuation of the actuator, and the mechanical actuator switch is dome switch, membrane switch or scissor switch. In this embodiment, the dome switch, membrane switch or scissor switch may form the switching component to be operated with the actuator arm provided.

In one embodiment, the mechanical or electrical actuator switches is arranged to switch as a response to relative movement of the main body and the actuator or the mechanical actuator element upon actuating the actuator or the mechanical actuator element.

In another embodiment, the mechanical or electrical actuator switches is arranged to switch as a response to relative movement of the actuator arm the switching element upon actuating the actuator or the mechanical actuator element.

In a further embodiment, the mechanical or electrical actuator switches is arranged to switch as a response to relative movement of the actuator sensor and the electronic or magnetic actuator emitter upon actuating the actuator or the mechanical actuator element.

The remote control may comprise receptacle or securing feature or mechanism for securing the remote control to the light electric vehicle or to the handle bar of the light electric vehicle. The receptacle or securing feature may be provided to the main body and/or to the separate actuator body.

An advantage of the invention is that the drive system and remote control provide simple structure for controlling two different features of the drive system. Further, the remote control may be provided customisable and easy to repair as it may be provided from two separate parts. Furthermore, the drive system and the remote control may be operated with one hand for controlling two different features of the power unit of the light electric vehicle.

BRIEF DESCRIPTION OF THE DRAWINGS

The invention is described in detail by means of specific embodiments with reference to the enclosed drawings, in which.

DETAILED DESCRIPTION OF THE INVENTION

Figure 1:
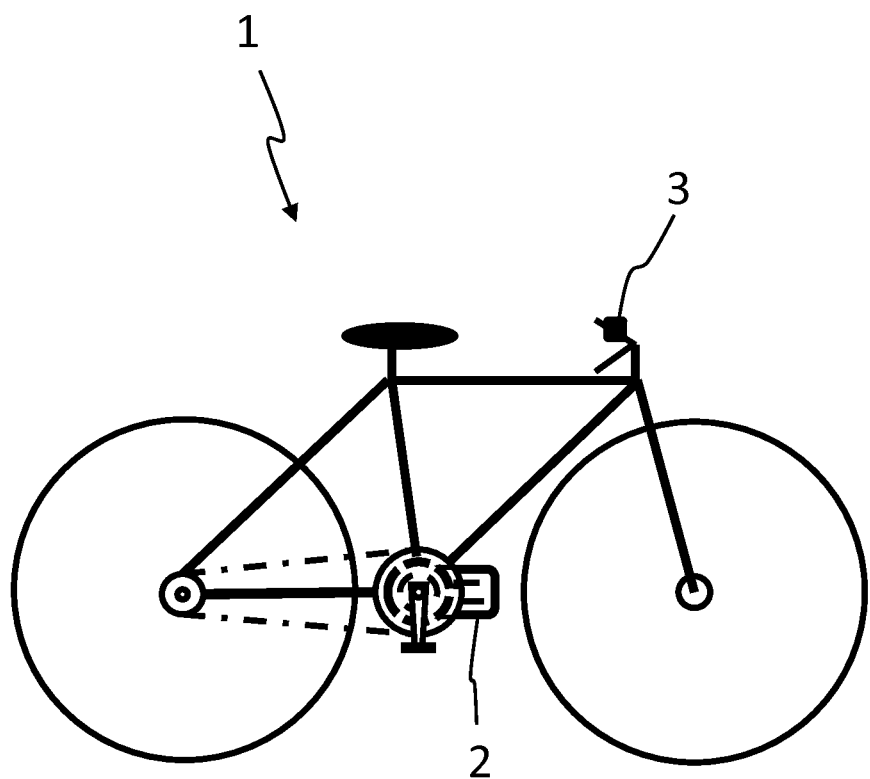
FIG. 1 shows schematically an electric bike with a power unit and remote control for controlling the power unit.

FIG. 1 shows a light electric vehicle 1 which is an electric bike. It should be noted that the present invention is limited any particular light electric vehicle. The light electric vehicle may be an electric bicycle, electric kick scooter or any other corresponding vehicle. However, the present invention may most suitable electric bikes. It should be noted, that as the invention is explained in relation to an electric bike 1, the invention may also be realised in connection with any other light electric vehicle. Thus, the electric bike is interchangeable to some other light electric vehicle.

The electric bike 1 comprises a drive system. The drive system comprises a power unit 2 for providing driving assistance and driving the electric bike. The power unit 2 is operatively connected to a crankshaft of the electric bike. It should be noted the power unit 2 may be also be operatively connected to central axis of a wheel of the electric bike 1 or another light electric vehicle, for example to the central axis of a rear wheel. Therefore, in the context term torsion shaft is used to represent crankshaft, wheel axis or the like to which assist power is provided by the power unit 2. Torsion shaft is the crankshaft in electric bikes 1 as they have pedals.

The drive system of the electric bike 1 further comprises a remote control 3 connect to the power unit 2 for operating the power unit 2, and further the electric bike 1.

Figure 2A:
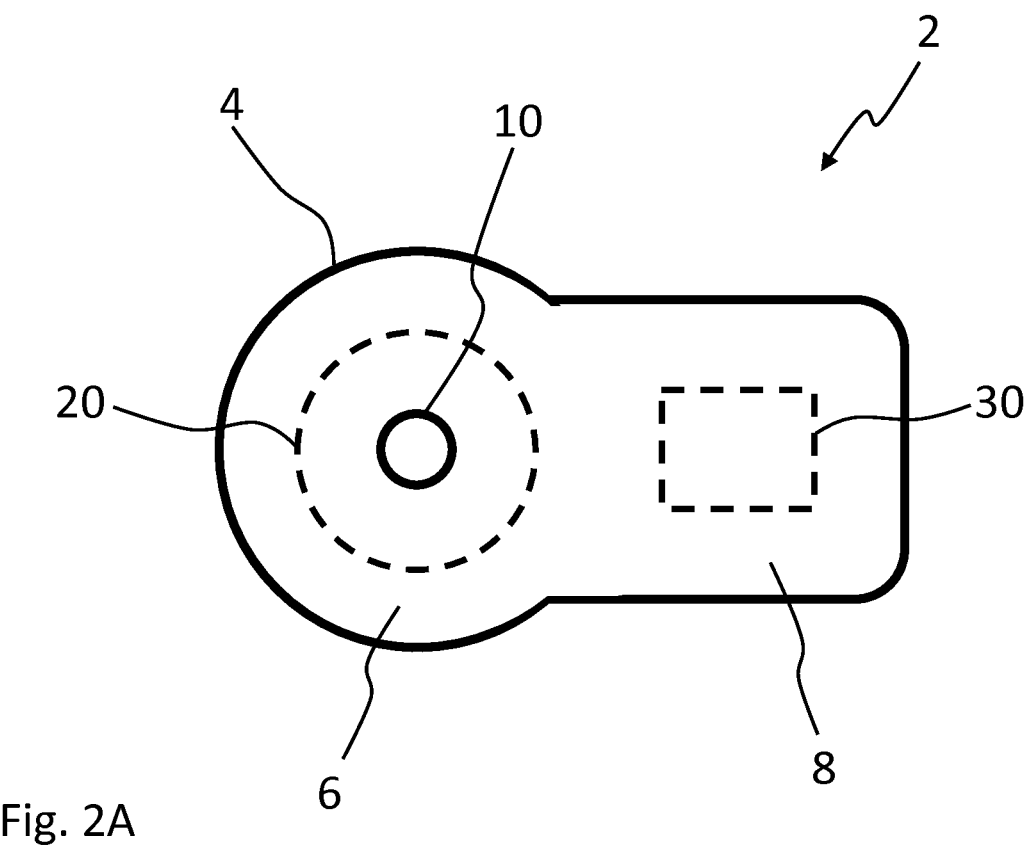
FIGS. 2A and 2B show schematically a power unit and drive system of a light electric vehicle.

FIG. 2A shows schematically the power unit 2 according to the present invention. The power unit 2 comprises a first motor 20 and a second motor 30. The first motor 20 is arranged to provide torque output to a crankshaft 10 of the electric bike 1 and thus provide or adjust power output of the power unit 2. The second motor 30 is arranged to adjust transmission ratio of the power unit 2. Accordingly, the first motor 20 is arranged to adjust cadence or rotational speed of the crankshaft 10 and the second motor 30 is arranged to adjust gearing of the power unit 2.

The power unit 2 comprises a housing 4. The first and second motor 20, 30 are both provided inside the housing 4. The housing 4 comprises a hub 6 provided around the crankshaft 10 and an arm 8 extending from the hub 6. The first motor 20 is provided to the hub 6 of the housing 4 and the second motor 30 is provided to the arm 8. However, the first motor 20 may also be arranged to be arm 8 and the second motor 30 to the hub 6. Thus, the first and second motor 20, 30 in FIG. 2A are interchangeable.

The power unit 2 further comprises a main gearing which is described in connection with FIGS. 13 to 17. The main gearing is provided to the power unit 2 for adjusting the transmission ratio of the power unit 2. The main gearing is provided between the first motor 20 and the crankshaft 10 and the torque to is supplied form the first motor 20 to the crankshaft 10 via the main gearing. The second motor 30 is connected to the main gearing and arranged to adjust transmission ration of the main gearing.

According to the above mentioned, the first motor 20 is an assist motor arranged to provide torque output to the crankshaft 10 of the electric bike 1. The second motor 30 is a control motor arranged to adjust transmission ration of the main gearing.

Figure 2B:
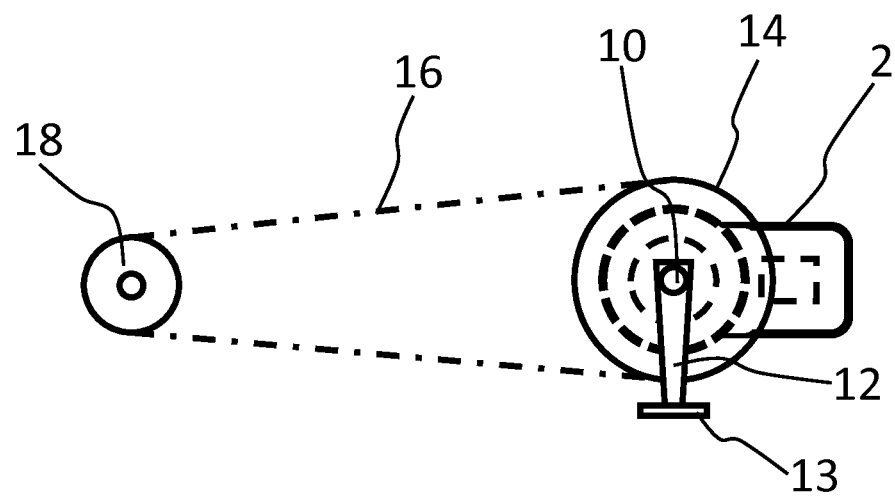

FIG. 2B shows schematically one embodiment of the electric bike transmission in which the power unit 2 is provided in connection with the crankshaft 10. The crankshaft 10 is connected to a chainwheel 14. The chainwheel 14 is connected to a rear axle 18, or rear wheel axle 18, with a chain 16. A pedal 13 is further connected to the crankshaft 10 with a pedal crank 12 such that a user riding the electric bike 1 may output torque to the crankshaft 10 by pedaling.

Figure 3A:
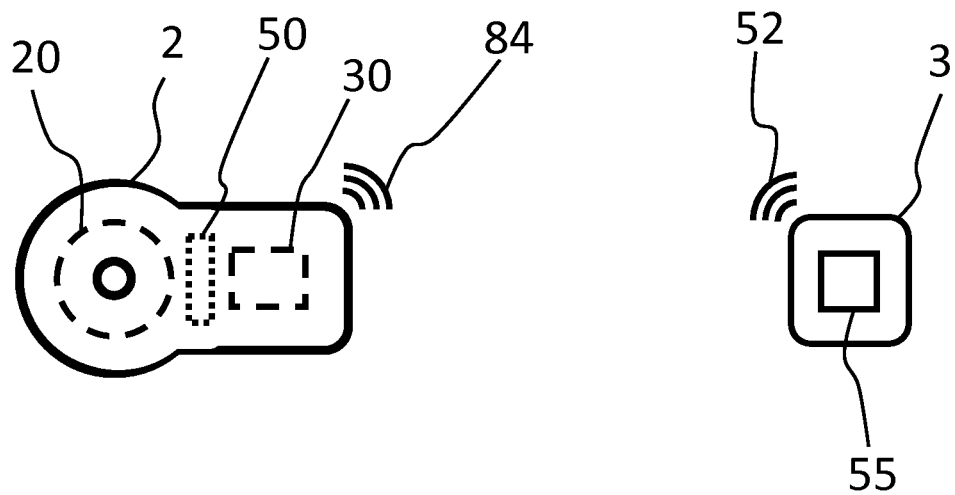
FIGS. 3A and 3B show schematically embodiments of the remote control in connection with the power unit.

FIG. 3A shows schematically one embodiment of the present invention in which the power unit 2 comprises a first wireless communication component 84. The remote control 3 comprises a second wireless communication component 52. The second wireless communication component 52 is configured to transmit control signals from the remote control 3 to the first wireless communication component 84. The first wireless communication component 84 is configured to receive control signals from the second wireless communication component 52 provided to the remote control 3.

Further, second wireless communication component 52 may be configured to receive signals from the first wireless communication component 84 and the first wireless communication component 84 may be configured to transmit signals to the second wireless communication component 52.

The first and second wireless communication component 84, 52 may be any known kind of wireless communication components, such as Bluetooth components, radio frequency transmitter/receiver or the like.

The power unit 2 further comprises central processing unit 50 comprising components for controlling the power unit 2 and the operation of the first motor 20 and second motor 30. The central processing unit 50 comprises a central memory having instructions for controlling the power unit 2 stored therein and a central processor configured to execute the instruction stored to the central memory.

The first wireless communication component 84 may be provided to the central processing unit 50. Alternatively, the first wireless communication component 84 is provided separately to the power unit 2 and connected to the central processing unit 50.

Similarly, the remote control 3 comprises a control unit 55 comprising components for operating the remote control 3 and generating control signals for the power unit 2. The control unit 55 comprises a control unit memory having instructions for operating the remote control 3 stored therein and a control unit processor configured to execute the instruction stored to the control unit memory.

The second wireless communication component 52 may be provided to the control unit 55. Alternatively, the second wireless communication component 52 is provided separately to the power unit 2 and connected to the central processing unit 50. Thus, control signals may be transmitted from the remote control 3 to the power unit 2 with the first and second wireless communication component 84, 52, and possibly vice versa. Further, control signals may be transmitted from the control unit 55 to the central processing unit 50 with the first and second wireless communication component 84, 52.

Figure 3B:
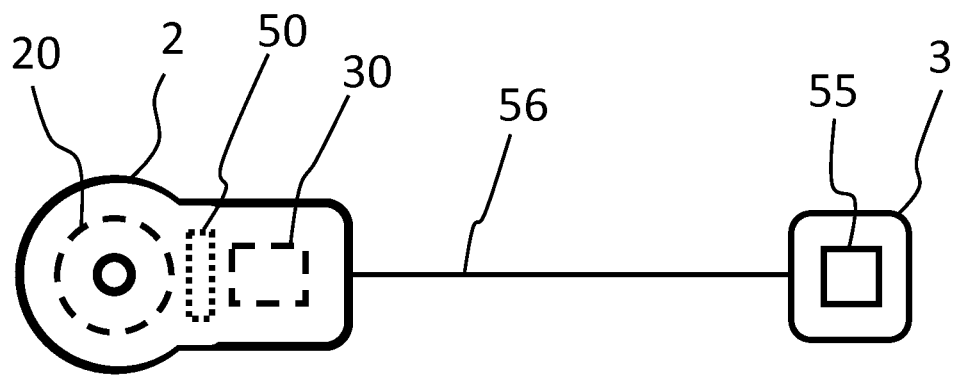

FIG. 3B shows another embodiment, in which the remote control 3 is connected to the power unit 2 with a communication line 56. In this embodiment, the central processing unit 50 and the control unit 55 may be similar is in the embodiment of FIG. 3A. The communication line 56 is connected to the central processing unit 50 and the control unit 55. Accordingly, the communication line extends between the central processing unit 50 and the control unit 55, and the remote control 3 and the power unit 2. Thus, control signals may be transmitted from the remote control 3 to the power unit 2 via the communication line 56, and possibly vice versa. Further, control signals may be transmitted from the control unit 55 to the central processing unit 50 via the communication line 56.

According to the present invention, the remote control 3 comprises a main body 60 and a separate actuator body 70, as shown in FIGS. 4A, 4B, 5A and 5B.

In the present invention, the main body 60 comprises the control unit 55. Further, the separate actuator body 70 comprises actuator(s) for operating the remote control 3 and/or the control unit 55.

The main body 60 and the separate actuator body 70 together form the remote control 3. The separate actuator body 70 is detachably connected to the main body 60 such that it may be detached, removed and replaced. The separate actuator body 70 is preferably detachably connected to the main body 60 with a mechanical connection. The mechanical connection may be any kind of suitable mechanical connection enabling detaching the separate actuator body 70 from the main body 60 easily without breaking the remote control 3 and without disassembling the remote control fully.

Further, it should be noted that the actuator body 70 may also be provided as integral part of the main body 60. Further alternatively the actuator body 70 may be omitted and the actuators may be provided directly to the main body 60.

It should be noted, that the present invention is not limited any mechanical structure and connection of the main body 60 and the separate actuator body 70 or their connection.

Figure 4A:
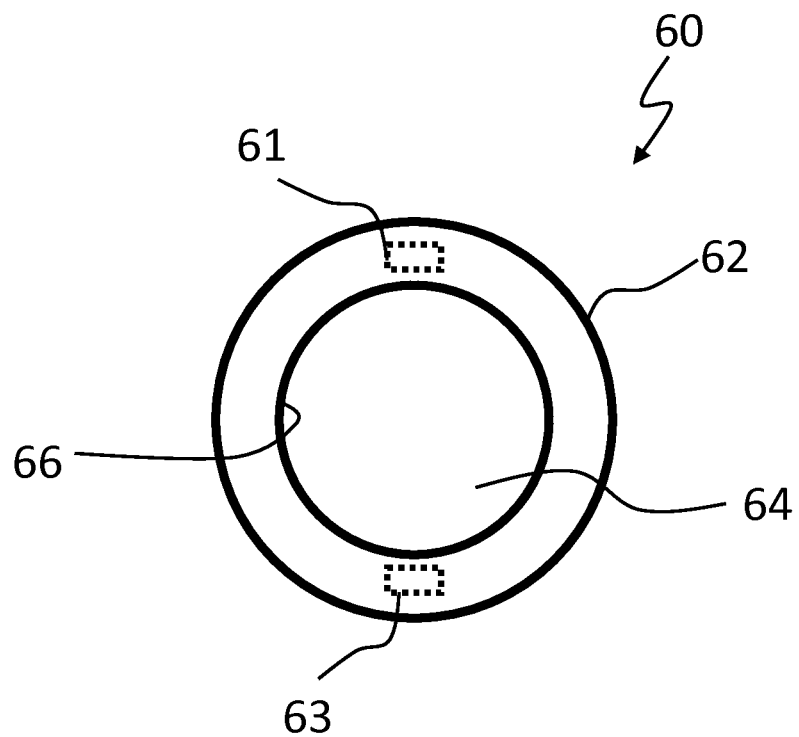
FIGS. 4A, 4B, 5A, 5B, 6A, 6B, 7A, 7B, 8A, 8B, 9, 10A, 10B, 11A, 11B, 12A and 12B show schematically different embodiments of the power unit according to the present invention.
Figure 4B:
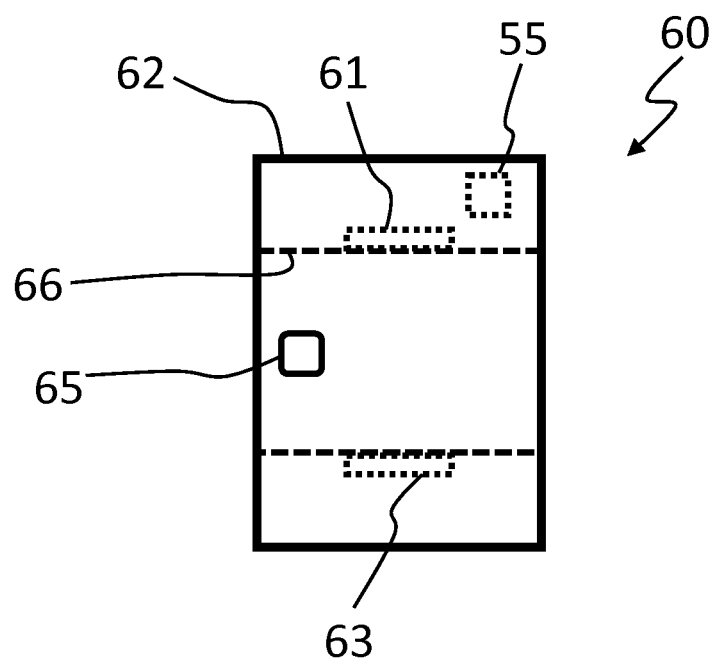

The main body 60 is provided with the control unit 55 of the remote control 3, as shown in FIG. 4B. The separate actuator body 70 is provided with actuator(s) 77, 79 arranged to operate the remote control 3 and/or the control unit 55 for generating control signals with the remote control 3 and/or the control unit 55 for operating the power unit 2. The actuators 77, 79 may be any kind of actuators or actuator elements arranged to be actuated by the user. The actuation of the actuators 77, 79 by the user generates the control signals in the remote control 3 and/or in the control unit 55. The control signals are further transmitted to the power unit 2 and/or the central processing unit 50 via the communication line 56 or with the first and second wireless communication components. The actuators 77, 79 may be any kind of mechanical actuators or electronic actuators.

FIG. 4A shows one embodiment of the main body 60. The main body 60 is ring-shaped or sleeve main body 60 a main body recess or opening 64 defined by an inner connecting surface 66. The inner connecting surface 66 is a cylindrical surface forming a cylindrical main body recess 64 inside the main body 60. The main body recess 64 is a through opening extending through the main body 60, as shown in FIG. 4B. Alternatively, the main body recess 64 may be a blind opening open only in one end of the main body recess 64.

The main body 60 comprises also an outer surface 62.

The outer surface 2 may form at least part of the external surface of the remote control 3.

As shown in FIG. 4B, the main body 60 further comprises an operating switch 65. The operating switch is arranged to switch the remote control 3 and/or the actuators between a first operating state and a second operating state. In the first operating state the remote control 3 and/or actuators are arranged to control the operation of the first motor or the assist motor 20, or the rotational speed or cadence. In the second operating state the remote control 3 and/or actuators are arranged to control the operation of the second motor or the control motor 30.

Therefore, in the first operating state the actuators are connected to the assist motor 20 and arranged to adjust the torque output of the assist motor 20. Further, in the second operating state the actuators are connected to the control motor 30 and arranged to adjust the transmission ratio main gearing.

In a preferred embodiment of the present invention, in the first operating state of the remote control and the actuators thereof are arranged to adjust the rotation speed of the assist motor 20 and therefore the cadence of the crankshaft 10.

In an alternative embodiment, in the first operating state of the remote control and the actuators thereof are arranged to adjust power output or torque value of the assist motor 20.

In one embodiment, the operating switch 65 is provided with two functions or configured to provide two functions. The first function is switching between the first and second operating state. The second function is to operate the power or torque value outputted by the assist motor 20. The second function is operable despite in which operating state the remote control 3 is. Accordingly, the first and second function may be separate from each other by different actuation manners of the operating switch 65. Thus, the operating switch may be configured to provide the first function based on a first actuation manner or as response to a first actuation input, and be configured to provide the second function based on a second actuation manner or as response to a second actuation input. For example, long press or long actuation time of the operating switch 65 is configured to provide the first function and change the operating state of the remote control 3 between the first and second operating states. Similarly, a short press or actuation time of the operating switch 65 is configured to provide the second function an adjust the power or torque value outputted by the assist motor 20. This could also be vice versa or provided in another actuation manners.

Accordingly, the operating switch 65 may increase or decrease the torque output value of the assist motor 20 by a predetermined value as a response to the second function of the operating switch 65.

When the operating switch 65 is provided with the first and second function, in the first operating state of the remote control 3 or the actuators the actuators are configured to adjust the rotation speed of the assist motor and thus the cadence of the crankshaft 10.

Figure 12A:
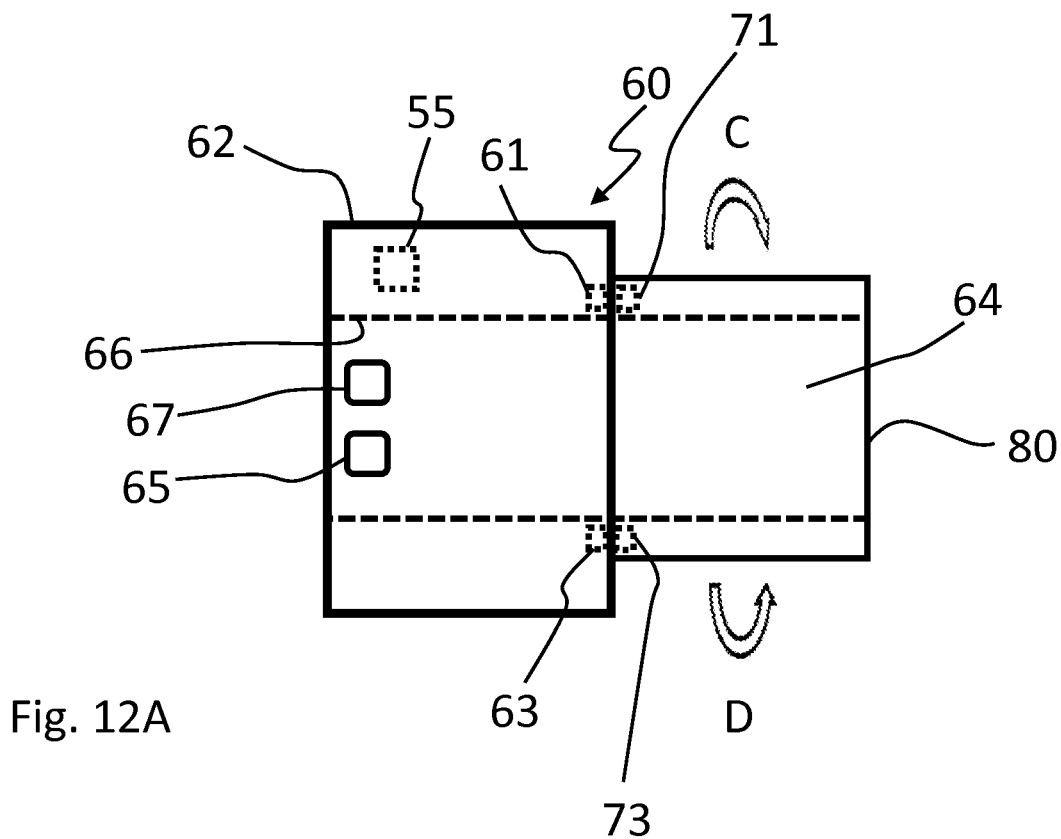

It should be noted that, this two functions of the operating switch may be also provided with operating switches having two switch elements 65, 67, for example in FIG. 12A. In this case both the switch elements 65 and 67 may be arranged to have two functions. Accordingly, the first switch element 65 may be arranged to decrease the torque output value of the assist motor 20 as a response to the second function actuation. Similarly, the second switch element 67 may be arranged to increase the torque output value of the assist motor 20 as a response to the second function actuation.

Further, when there are two switch elements 65, 67, only one of them may be provided with two functions.

Accordingly, in the present invention the remote control 3 comprises the operating switch 65 configured to switch the remote control 3 or the actuators to the first and second operating state or between the first and second operating state. Accordingly, the same actuators may be used to control the assist motor 20 in the first operating state and the control motor 30 in the second operating state. Thus, the operating switch 65 may be used by the user to choose the first or second operating state of the actuators or the remote control 3.

The operating switch 65 may comprise a single switching element 65 as shown in FIG. 4A. Thus, in the embodiment, operating switch 65 or the switching element comprises a first mode position in which the remote control 3 or the actuators are in the first operating state, and a second mode position in which the remote control 3 or the actuators are in the second operating state.

The switching element 65 may be button, lever, touch button or surface or the like. The present invention is not limited to any particular switching element 65. The switching element may also be for example a capacitive or resistive pushbutton or the like.

In an alternative embodiment, the operating switch may comprise two switching elements. Thus, the operating switch comprises a first switch element 65 arranged to switch the operating switch in a first mode position in which the remote control 3 and/or the actuators are in the first operating state, and a second switch element 67 arranged to switch the operating switch in a second mode position in which the remote control 3 and/or the actuators are in the second operating state.

The operating switch 65, 67 comprises a mechanical operating switch or switching component. The mechanical operating switch may be dome switch, membrane switch, scissor switch or the like mechanical switch.

Alternatively, the operating switch comprises an electronic operating switch, such as capacitive switch or resistive switch.

In case of two switching elements, there may also be two mechanical operating switches or switching components.

Figure 5A:
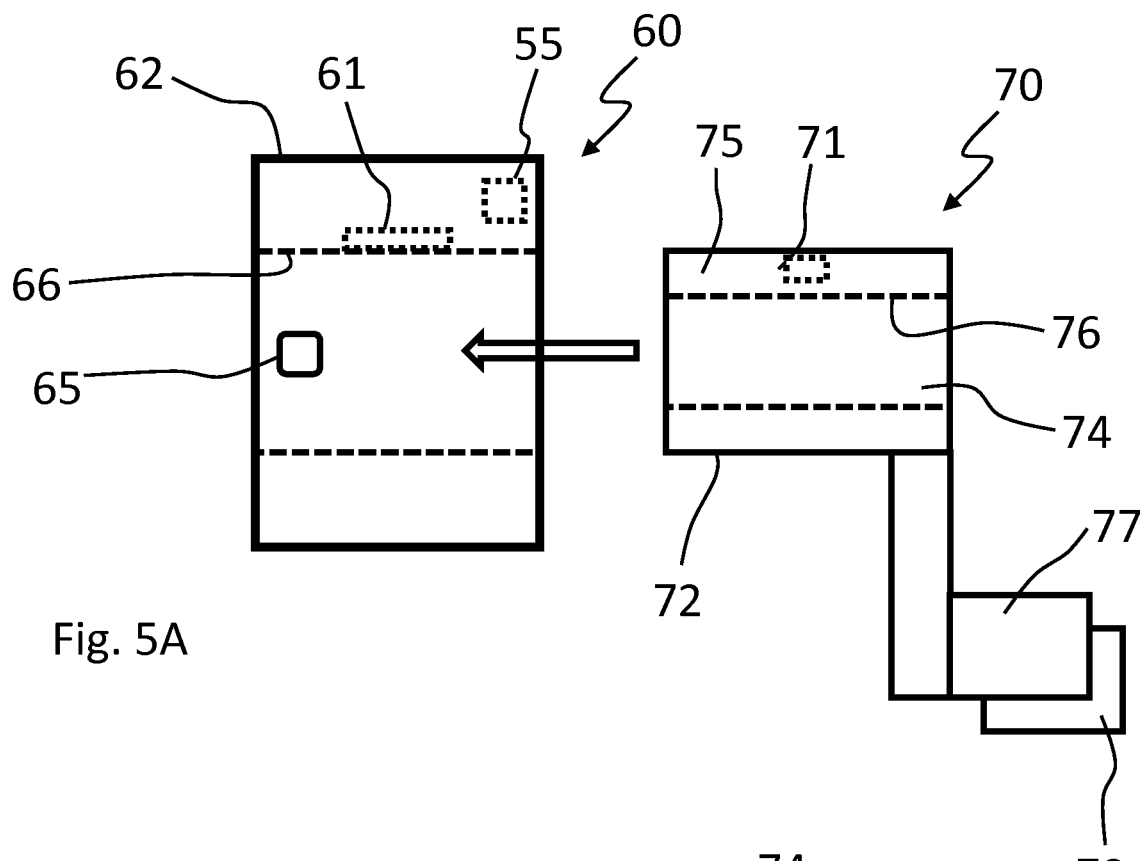

As shown in FIG. 5A, the remote control 3 comprises the separate actuator body 70. The separate actuator body 70 comprises an insert portion 75 having outer connecting surface 72. The insert portion 75 of the separate actuator body is arranged into the main body recess 64 for connecting the separate actuator body 70 to the main body 60. When the insert portion 75 is inside the main body recess 64, the inner connecting surface 66 of the main body 60 is towards the outer connecting surface 72 of the separate actuator body 70. Further, when the insert portion 75 is inside the main body recess 64, the inner connecting surface 66 of the main body 60 may be against the outer connecting surface 72 of the separate actuator body 70. Preferably, the shape and dimensions of the inner connecting surface 66 of the main body 60 and the outer connecting surface 72 of the separate actuator body 70 correspond or conform each other.

Figure 9:
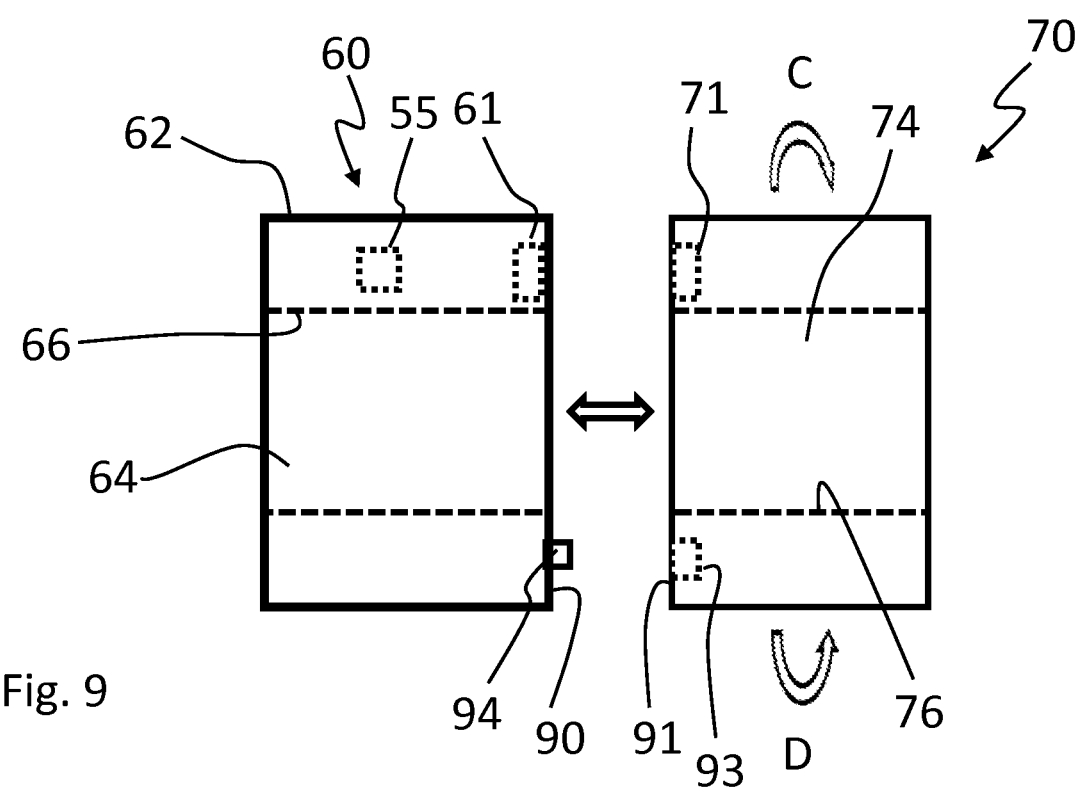

The remote control 3 may further comprise a locking mechanism 93, 94 arranged to connect the main body 60 and the separate actuator body 70, 80 together detachably together, as shown in FIG. 9. The locking mechanism may be any kind of mechanical locking mechanism such as quick-connect fitting, threads, screws, snap lock mechanism or the like mechanism allowing detaching the separate actuator body from the main body.

The separate actuator body 70 is further provided with an actuator body recess 74. The actuator body recess 74 may be arranged to receive the handle bar of the electric bike 1 for attaching the remote control 3 to the electric bike 1 such that inner surface 76 of the actuator body recess 74 is towards or against the handle bar or some other part of the electric bike 1.

The remote control may be further provided with an attachment mechanism for attaching and securing the remote control to the handlebar of the electric bike.

Figure 5B:
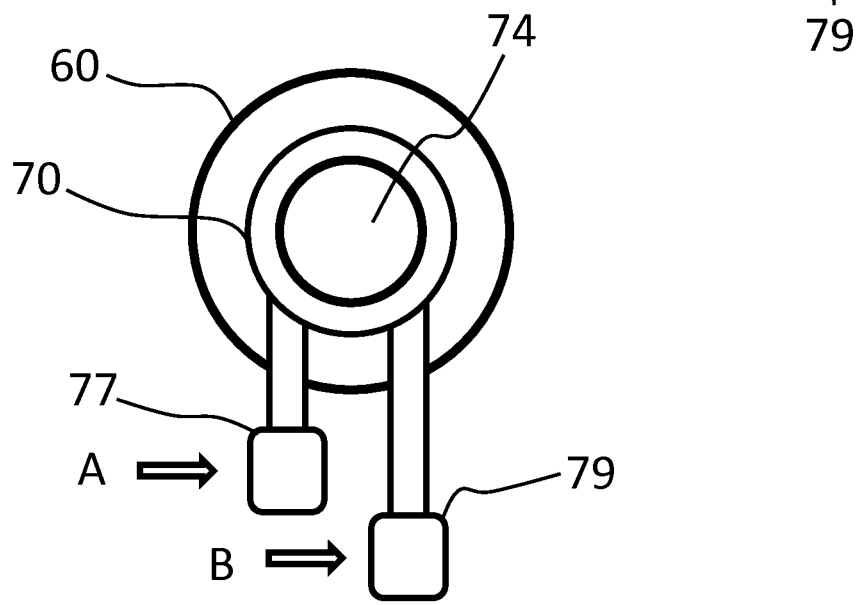

The actuator body 70 further comprises one or more actuator elements for operating the remote control 3 and for providing the control signals to the power unit 2. In the embodiment of FIGS. 5A and 5B, the remote control 3 comprises two mechanical actuator elements 77, 79 arranged to operate the remote control 3 for generating first type and second type control signals for the power unit 2.

In the present invention, actuating or operating the actuators or actuator elements 77, 79, by a user, causes the remote control 3 and/or the control unit 55 to generate the control signals and transmit the control signals to the power unit 2. The actuation of the actuator or actuator elements is detected by the control unit 55. Thus, the control unit 55 generates the control signals as a response to the actuation of actuator elements 77, 79.

For transmitting the actuation of the actuator elements 77, 79 to the control unit 55 or for detecting the actuation of the actuator elements 77, 79 by the control unit 55, the remote control 3 comprises one or more actuator switches 61, 71, arranged detect actuation of the actuator or actuator elements 77, 79. Accordingly, actuating the actuator or the actuator elements 77, 79 is arranged to switch the one or more actuator switches 61, 71. The control unit 55 detects the switching of the one or more actuator switches 61, 71 and generates control signals based on the switching. Alternatively, switching of the one or more actuator switches generates the control signals automatically in the control unit 55. Thus, the actuator switch 61, 71 is arranged transmit the actuation of the actuator elements to the control unit 55 and further with the control unit 55 to the power unit 2 as control signals. Thus, the actuator switch 61, 71 is connected to the actuators or actuator elements 77, 79 and to the control unit 55, or between them, for detecting or transmitting the actuation to the control unit 55.

In the embodiment of FIGS. 5A and 5B, the actuator switch 61, 71 is mechanical actuator switches 61 arranged to detect actuation of the actuator or actuator elements 77, 79. The mechanical actuator switch comprises one or more actuator arms 71 or actuator members provided to the separate actuator body 70 and one or more switching components 61 provided to the main body 60.

The actuator arm(s) 71 are provided to the outer connecting surface 72 of the separate actuator body 70 or in connection of the outer connecting surface 72. The switching component(s) are provided to the inner connecting surface 66 or in connection thereof. However, the actuator switch 61, 71 and/or the actuator arm(s) 71 and the switching component(s) 61 may be arranged in any suitable manner and the present invention is not limited to any configuration of the actuator switch or the actuator arm(s) 71 and the switching component(s) 61.

The switching component 61 may be for example a dome switch, membrane switch or scissor switch or the like mechanical switching component.

Accordingly, actuating or operating the actuator or actuator elements 77, 79 causes the actuator arm 71 to move relative to the main body 60 or the switching component 61 and switch the switching component 71 for providing detection of the actuations and for generating the control signals. Thus, actuator arm 71 push or place the switching component 71 from one state to another.

In the embodiment of FIGS. 4A and 4B, the actuator elements 77, 79 are levers. The lever may be operated by actuating or pushing the levers as indicated with arrows A and B. Actuating the levers 77, 79 causes switching of the actuator switch 61, 71 as described above.

Thus, in the first operating state of the remote control 3, the actuator or actuator elements 77, 79 are arranged to provide a first type control signal by the control unit 55 as a response to actuating the actuator or actuator elements 77, 79. In the second operating state the actuator or actuator elements 77, 79 are arranged to provide a second type control signal by the control unit 55 as a response to actuating the actuator or actuator elements 77, 79.

Accordingly, in the first operating state the actuator or actuator elements 77, 79 are connected to the assist motor 20 and arranged to adjust the torque output of the assist motor 20. Thus, in the first operating state the actuator or actuator elements 77, 79 are arranged to provide the first type control signal by the control unit 55 to the assist motor 20 as a response to actuating the actuator or actuator elements 77, 79. Accordingly, the first actuator element 77 is arranged to generate the first type control signal configured to increase the torque output of the assist motor 20. Similarly, the second actuator element 79 is arranged to generate the first type control signal configured to decrease the torque output of the assist motor 20.

Similarly, in the second operating state the actuator or actuator elements 77, 79 are connected to the control motor 30 and arranged to adjust the output of the control motor 30 and the transmission ratio the main gearing. Thus, in the second operating state the actuator or actuator elements 77, 79 are arranged to provide the second type control signal by the control unit 55 to the control motor 30 as a response to actuating the actuator or actuator elements 77, 79. Accordingly, the first actuator element 77 is arranged to generate the second type control signal configured to increase the transmission ratio of the main gearing. Similarly, the second actuator element 79 is arranged to generate the second type control signal configured to decrease the transmission ratio of the main gearing.

It should be noted that there could also be only one actuator element or lever 77, 79. In this, case the actuator element could be pushed in two different, or opposite directions, to generate different kinds of control signals for increasing or decreasing, respectively, the torque output of the assist motor 20 or the transmission ratio of the main gearing.

It should be further noted, that the above mentioned structure or operating principles may be applied to any of the embodiment of the present invention.

Figure 6A:
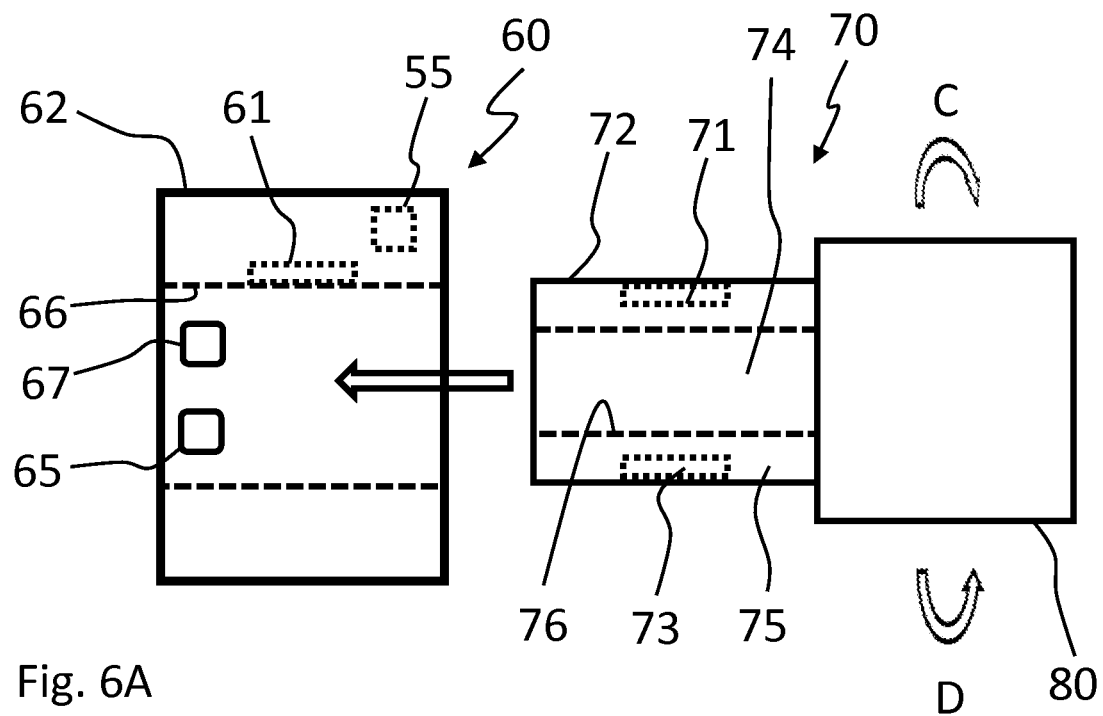
Figure 6B:
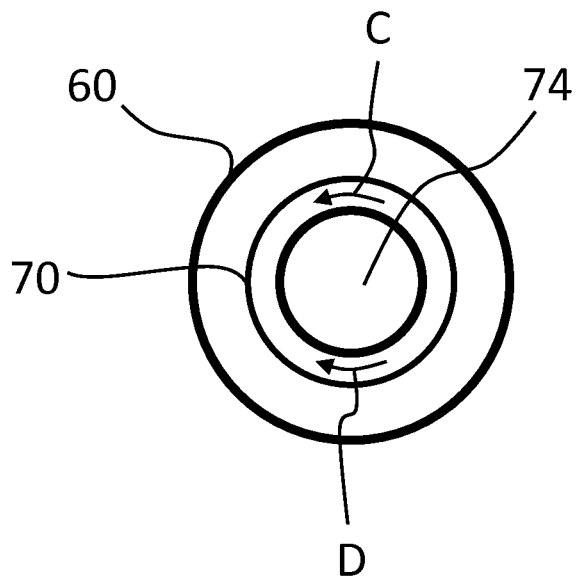

FIGS. 6A and 6B show another embodiment of the present invention. In this embodiment, there are two operating switches 65, 67. Thus, the operating switch comprises a first switch element 65 arranged to switch the operating switch in the first mode position in which the remote control 3 and/or the actuators are in the first operating state, and a second switch element 67 arranged to switch the operating switch in the second mode position in which the remote control 3 and/or the actuators are in the second operating state.

In the embodiment of FIGS. 6A and 6B, the mechanical connection between the main body of the separate actuator body 70 are similar to FIGS. 5A and 5B.

As shown in FIGS. 6A and 6B, the levers 77, 79 are replaced with a twist shifter 80. Thus, the twist shifter 80 is arranged to provide the actuator element of the remote control 3. The twist shifter 80 may be rotated in a first rotating direction C in relation to the main body 60 and in a second rotating direction D in relation to the main body 60. The actuator body insert 75 may rotate inside the main body recess 64 in response to rotating the twist shifter 80. Alternatively, only the twist shifter is rotated and actuator body insert 75 is kept still.

In this embodiment, the remote control 3 comprises one or more electronic actuator switches 61, 63, 71, 73 arranged detect actuation of the actuator or actuator element 80 or the twist shifter 80.

The electronic actuator switch 61, 63, 71, 73 comprises an actuator sensor 61 provided to the main body 60. The electronic actuator switch further comprises a first actuator emitter 71 and a second actuator emitter 73 provided to the separate actuator body 70. The actuator emitters 71, 73 may be electronic components or magnetic components and the actuator sensor 61 may be configured to detect movement of the actuator emitters 71, 73 relative to the actuator sensor 61.

The electronic actuator switch in FIGS. 6A and 6B is a Hall switch. The actuator sensor 61 is a Hall sensor and the actuator emitters 71, 73 and ferromagnets with different polarities. The different polarities of the ferromagnets generate increasing and decreasing control signals, a response to the first and second rotating direction C and D of the twist shifter 80, similarly as in the embodiment of FIGS. 5A and 5B. In this case, the actuator element could be rotated in two different, or opposite directions C and D, to generate different kinds of control signals for increasing or decreasing, respectively, the torque output of the assist motor 20 or the transmission ratio of the main gearing depending operating state of the remote control 3.

Figure 7A:
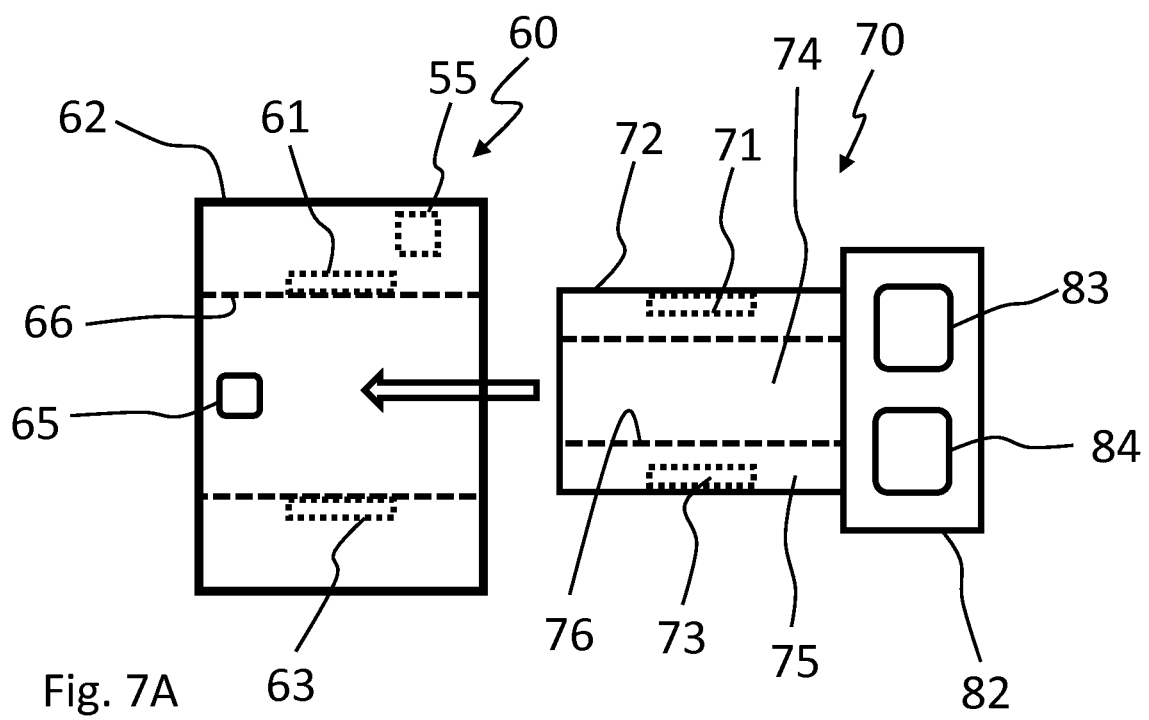
Figure 7B:
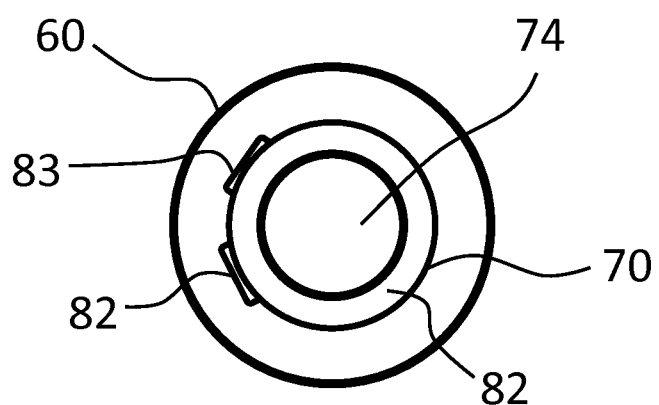

FIGS. 7A and 7B show still another embodiment in which the actuator elements and provided as pushbuttons 83, 84. The pushbuttons 83, 84 are provided to an actuator portion 82 of the separate actuator body 70. The actuator portion 82 is arranged outside the main body 60 or main body recess 64. The remote control further comprises a first actuator switch 61, 71 connected to the first pushbutton 83 and a second actuator switch 63, 73 connected to the second pushbutton 84.

In one embodiment, the first and second actuator switches are mechanical actuator switches. The mechanical actuator switches comprise a first actuator arm 71 and a second actuator arm 73 connected to the first and second pushbuttons 83, 85, respectively, and provided to the separate actuator body 70, or the insert portion 75 thereof, or in connection with the outer connecting surface 72 thereof. The mechanical actuator switch further comprise a first mechanical switching component 61 and a second mechanical switching component 63. The first and second switching components 61, 63 are provided to the main body 60, or in connection with the inner connecting surface 66. The first actuator arm 71 is arranged in connection with or connected to the first switching component 61 and the second actuator arm 73 is arranged in connection with or connected to the second switching component 63.

Actuating or pushing the first pushbutton 83 causes the first actuator arm 71 to move in relation to the first switching component 61 and to switch or push or operate the first switching component 61 for generating the control signal for the power unit 2. Similarly, actuating or pushing the second pushbutton 84 causes the second actuator arm 73 to move in relation to the second switching component 63 and to switch or push or operate the second switching component 63 for generating the control signal for the power unit 2.

The mechanical switching component 61, 63 may be any known kind switching component such as a dome switch.

Accordingly, in the first operating state or the remote control 3 of the actuator or the pushbuttons 83, 84 defined by the actuator switch 65, the remote control 3 or the pushbuttons 83, 84 are connected to the assist motor 20. Thus, the first and second pushbuttons 83, 84 is arranged to provide the first type control signal by the control unit 55 to the assist motor 20 as a response to actuating the actuator or first and second pushbuttons 83, 84. Accordingly, the first pushbutton 83 is arranged to generate the first type control signal configured to increase the torque output of the assist motor 20. Similarly, the second push button is arranged to generate the first type control signal configured to decrease the torque output of the assist motor 20.

Similarly, in the second operating state of the remote control 3 or the actuator or the pushbuttons 83, 84 defined by the actuator switch 65, the remote control 3 or the pushbuttons 83, 84 are connected to the control motor 30 and arranged to adjust output of the control motor 30 and the transmission ratio of the main gearing. Thus, in the second operating state the actuator or pushbuttons 83, 84 are arranged to provide the second type control signal by the control unit 55 to the control motor 30 as a response to actuating the actuator or pushbuttons 83, 84. Accordingly, the first pushbutton 83 is arranged to generate the second type control signal configured to increase the transmission ratio of the main gearing. Similarly, the second pushbutton 84 is arranged to generate the second type control signal configured to decrease the transmission ratio of the main gearing.

It should be noted that there could also be only one pushbutton 83. In this, case the push button 83 could be pushed or provided in a first mode position in which the remote control 3 is in the first operating state, and a second mode position in which the remote control 3 is in the second operating state.

Figure 8A:
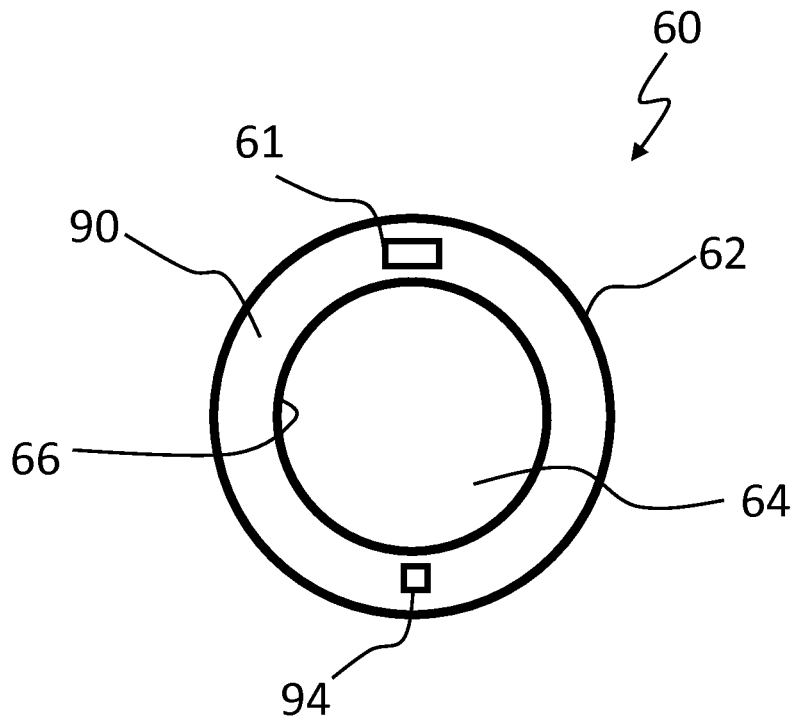
Figure 8B:
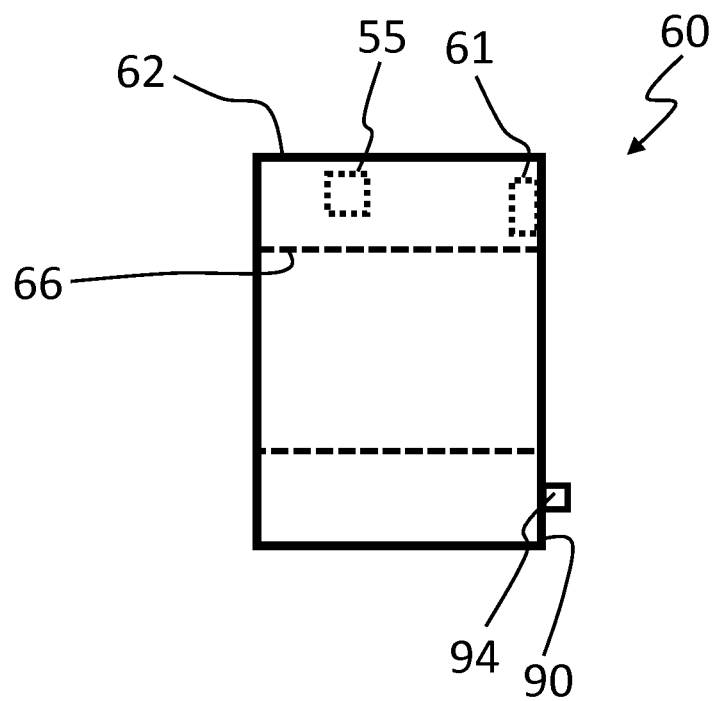

FIGS. 8A and 8B show schematically another embodiment of the main body 60. In this embodiment, the switching component 61 is provided to an end surface 90 of the main body 60 or in connection with the end surface 90 of the main body 60. There may be one or more switching components 61 in the main body 60. The main body 60 is further provided a locking mechanism 94 for attaching the separate actuator body 70 to the main body 60 in detachable manner.

FIG. 9 shows schematically the main body 60 of FIGS. 8A and 8B and the separate actuator body 70. The separate actuator body 70 also has locking mechanism 93 provided to an end surface 91. In this embodiment, the main body 60 and the separate actuator body 70 are attached and connected to each other adjacently such that end surface 90 of the main body 60 and the end surface 91 of the separate actuator body 70 are against each other. The main body 60 and the separate actuator body 70 are attached detachably to each other with locking mechanism 93, 94, by utilizing locking feature(s) 94 in the main body and locking feature(s) in the separate actuator body 70. The locking mechanism 93, 94 may be any known mechanical locking mechanism configured to attach the main body 60 and the separate actuator body 70 to each other, as disclosed above. Accordingly, in this embodiment the end surface 90 of the main body 60 and the end surface 91 of the separate actuator body form the connecting surfaces.

In this embodiment, the main body recess 64 and the actuator body recess 74 are both aligned and arranged to receive handle bar of the electric bike 1 or some other component or part of the electric bike for attaching the remote control 3 to the electric bike 1.

In the embodiment of FIG. 9, the separate actuator body 70 or the actuator is provided as twist shifter which may be rotated in two opposite directions C and D. Accordingly, this corresponds the actuator or actuator element 80 of FIGS. 6A and 6B. Alternatively, the separate actuator body 70 may comprise levers 77, 79 as in FIGS. 5A and 5B or pushbuttons as in FIGS. 7A and 7B. Further, the actuator switch 61, 71 may be any mechanical or electric actuator switch as disclosed above in connection of other embodiments.

Further, in the embodiment of FIG. 9, the switching component 61 or components may be provided in connection with the end surface 90 of the main body 60 or on the end surface 90 of the main body 60. Similarly, the actuator arm(s) 71 or actuator emitter(s) 71 is provided in connection end surface 91 of the separate actuator body 70 or to the end surface 91 of the separate actuator body 70. There may be one or more switching components 61 in the main body 60 and one or more actuator arm(s) 71 or actuator emitter(s) 71 in the separate actuator body 70.

In the embodiment of FIG. 9, the control unit is provided to the main body 60. The operating switch 65 may be provided to the main body 60 or to the separate actuator body 70.

Figure 10A:
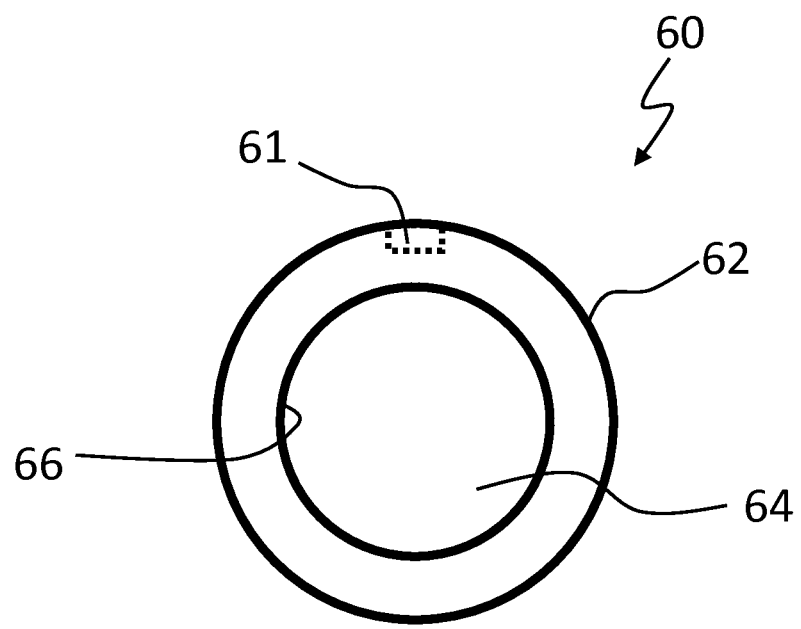
Figure 10B:
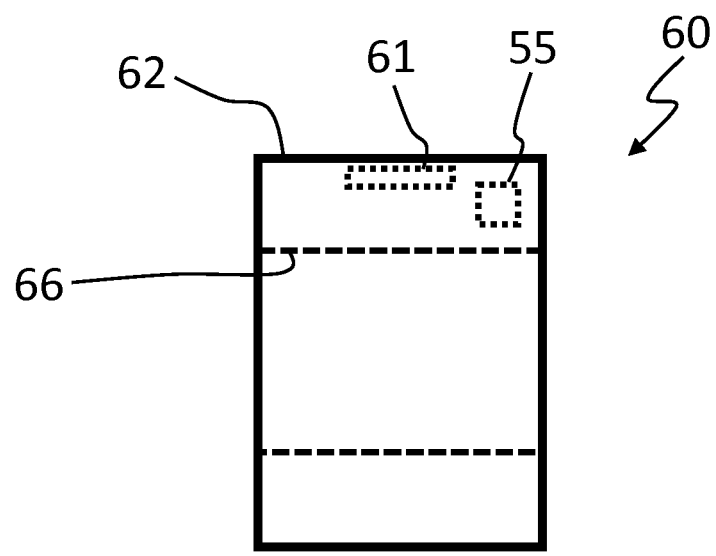

FIGS. 10A and 10B show an alternative embodiment of the main body 60. In this embodiment, the main body recess 64 is arranged to receive handle bar of the electric bike 1 or some other component or part of the electric bike for attaching the remote control 3 to the electric bike 1.

Further, the switching component 61 or components are provided in connection with the outer surface 62 or on the outer surface 62 of the main body 60.

The outer surface 62 is arranged to form the outer connecting surface between the main body 60 and the separate actuator body 70.

Figure 11A:
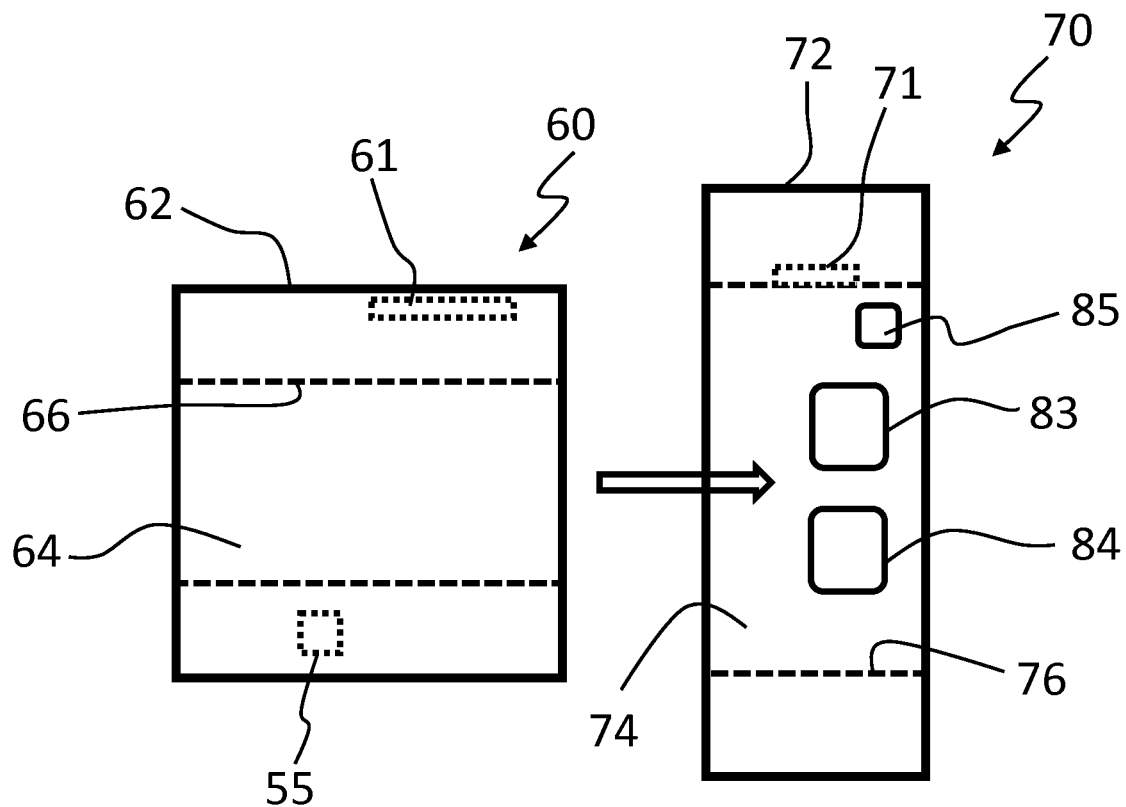
Figure 11B:
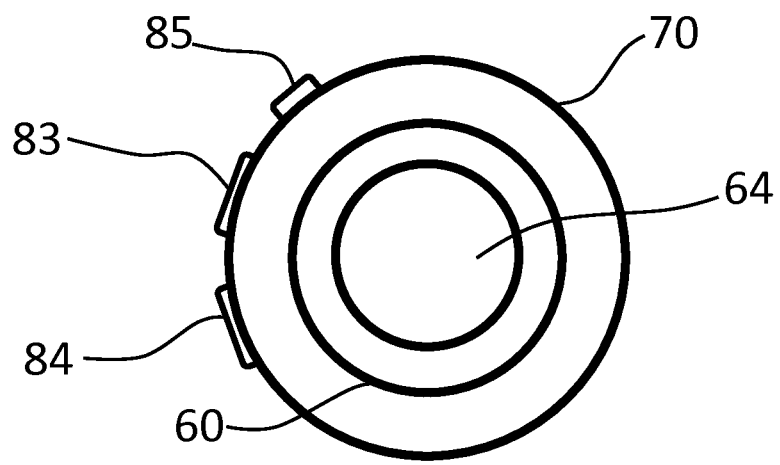

FIGS. 11A and 11B show schematically the main body 60 of FIGS. 10A and 10B together with the separate actuator body 70. In this embodiment, the separate actuator body 70 comprises the actuator body recess 74. The actuator body recess 74 or the inner surface 76 thereof is dimensioned and formed to correspond and/or conform main body 60 and outer surface 62 thereof. The inner surface 76 of the actuator body recess 74 is arranged to form inner connecting surface. Accordingly, the main body 60 or at least part of the main body 60 is arranged into the actuator body recess 74 for connecting the separate actuator body 70 to the main body 60. Thus, the main body 60 is arranged inside the actuator body recess 74 such that the outer surface 62 of the main body 60 is towards or against the inner surface 76 of the actuator body recess 74.

In this embodiment, switching component 61 or components are provided in connection with the outer surface 62 or on the outer surface 62 of the main body 60. The actuator arm(s) 71 or actuator emitter(s) 71 is provided in connection inner surface 76 of the actuator body recess 74 or to the inner surface 76 of the actuator body recess 74. There may be one or more switching components 61 in the main body 60 and one or more actuator arm(s) 71 or actuator emitter(s) 71 in the separate actuator body 70.

In the embodiment FIGS. 11A and 11B, the actuator or actuator elements 83 and 84 are provided as pushbuttons 83, 84 similarly as in the embodiment of FIGS. 7A, 7B. Alternatively, the actuator or actuator elements 83, and 84 may be provided as actuator levers 77, 79 as in the embodiment of FIGS. 5A and 5B, or as twist shifter as in the embodiment of FIGS. 6A and 6B.

Furthermore, as shown in FIG. 11A, the control unit 55 is provided to the main body 60 and the actuator elements 83, 84 as well as the actuator switch 85 to the separate actuator body 70.

Figure 12B:
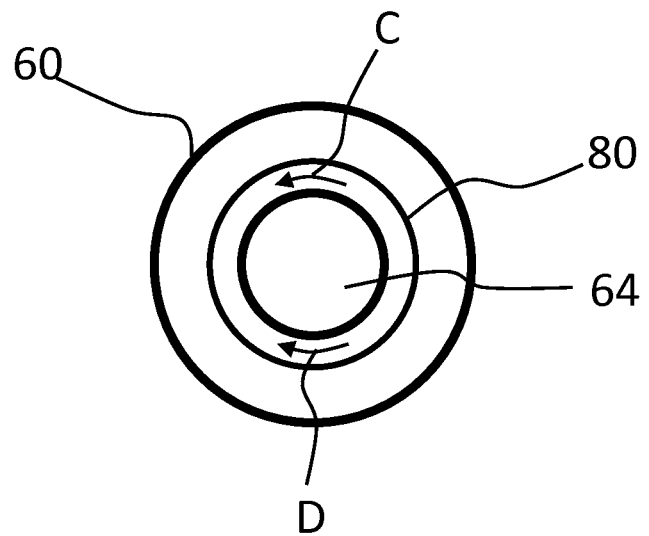

FIGS. 12A and 12B show schematically an embodiment, in which there is no separate actuator body, but the actuator 80 or actuator portion is provided as integral part of the main body 60. Therefore, the actuator 80 is provided directly to the main body 60 of the remote control 3. In this embodiment, there is no detachable actuator body, but the remote control 3 is provided as single piece unit.

In this embodiment, the actuator element 80 is provided as twist sifter 80, however the actuator element(s) may also be provided as levers or pushbuttons, as described above.

Furthermore, the actuator switch may be provided as mechanical or electronic actuator switch as disclosed above.

In the embodiment FIGS. 12A and 12B, the operating switch may comprise two switching elements 65, 67. Thus, the operating switch comprises a first switch element 65 arranged to switch the operating switch in the first mode position in which the remote control 3 and/or the actuator 80 and/or the actuator elements are in the first operating state, and a second switch element 67 arranged to switch the operating switch in the second mode position in which the remote control 3 and/or the actuator the actuator 80 and/or the actuator elements are in the second operating state.

The operating switch 65, 67 comprises a mechanical operating switch or switching component. The mechanical operating switch may be dome switch, membrane switch, scissor switch or the like mechanical switch.

Alternatively, the operating switch comprises an electronic operating switch, such as capacitive switch or resistive switch.

Furthermore, in this embodiment, the control unit 55, the operating switch 65, 67 and the actuator elements 80 are all in the main body 60.

Figure 13:
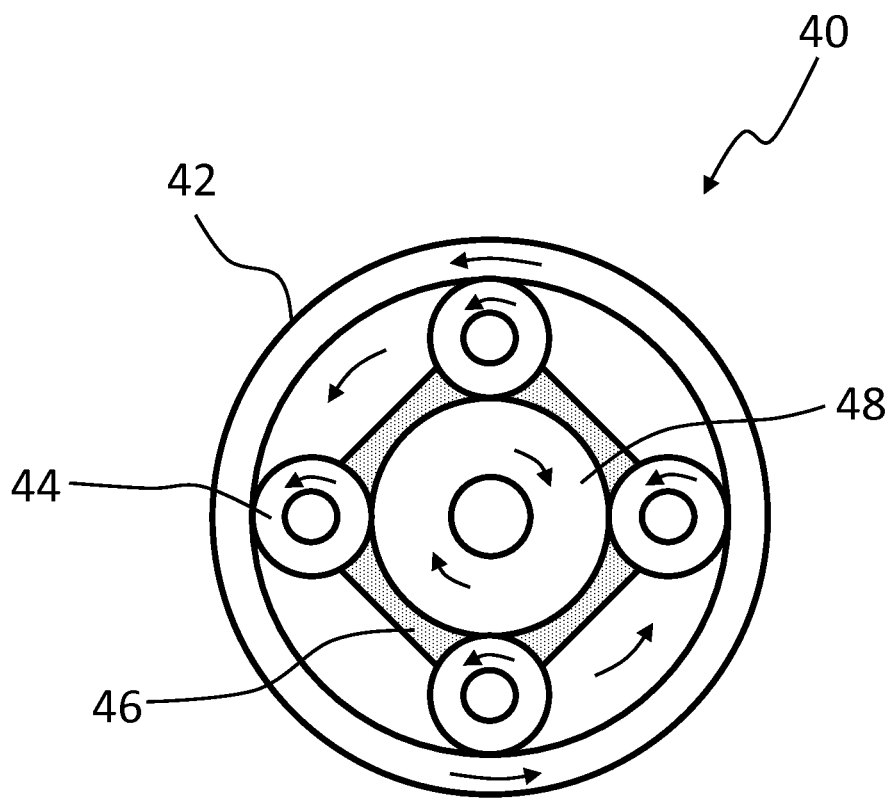
FIG. 13 shows schematically an epicyclic gearing for the power unit.

FIG. 13 one embodiment of the main gearing of the drive system according to the present invention. The main gearing 40 comprises main epicyclic gear set 40 comprises a sun gear 48, a ring gear 42, plurality of planet gears 44 between the sun gear 48 and the ring gear 42 and a planet carrier 46 connected to the planet gears 44 and arranged to receive rotation of a crankshaft 10. The main epicyclic gear set 40 is arranged adjust the transmission ratio together the control motor.

Figure 14:
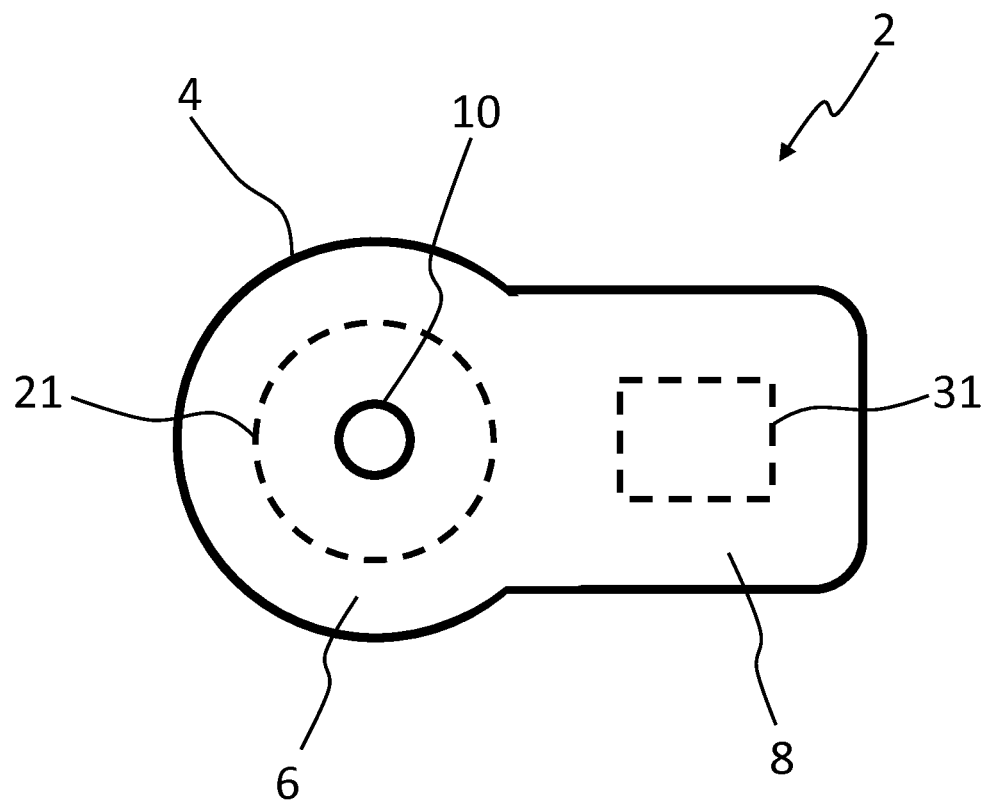
FIGS. 14, 15, 16 and 17 show schematically two different embodiments of the power unit of the light electric vehicle.

FIG. 14 shows an embodiment, in which the power unit 2 comprises the housing 4 accommodating the main epicyclic gear set 40, the assist motor 21 and the control motor 22. The housing 4 comprises the hub 6 arranged around the crankshaft 10 and the arm 8 extending from the hub 6. The assist motor 21 is arranged in the hub 6 and the control motor 31 is arranged in the arm 8.

It should be noted that mechanical structure and placement of the motors 21, 31 in the power unit 2 may be different.

Figure 15:
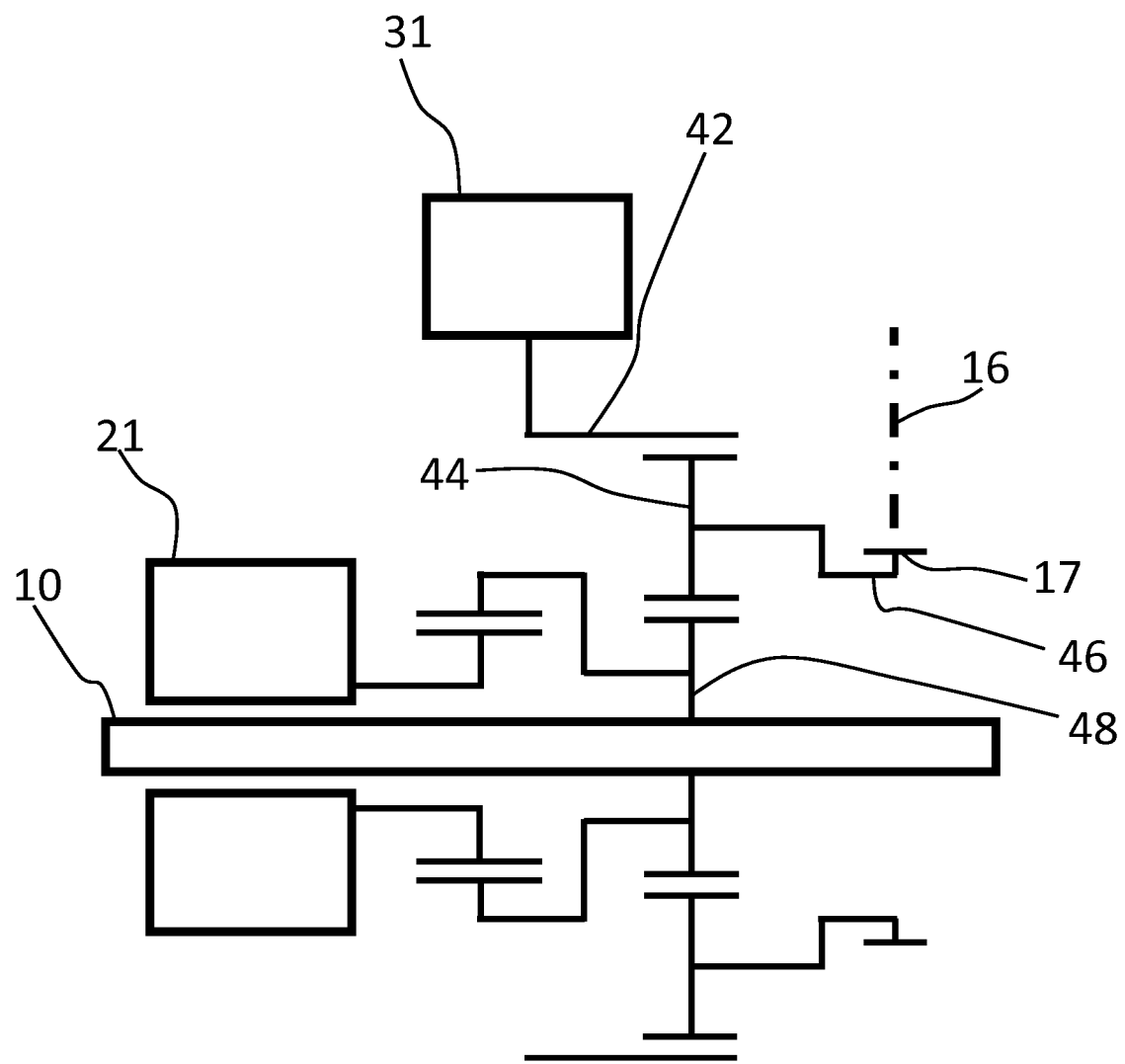

FIG. 15 further shows schematically the structure of the power unit of FIG. 14 together with the main epicyclic gear set 40 of FIG. 13. The crankshaft 10 is connected to the sun gear 48 of the main epicyclic gear set 40 and the chainwheel 17 is connected to the planet carrier 46. Further, the assist motor 21 is connected to the sun gear 48 of the main epicyclic gear set 40 and the control motor 31 is connected to the ring gear 42 of the main epicyclic gear set 40.

Accordingly, in the first operating state, switched by the actuator switch, the remote control 3 and the actuators or actuator elements are operatively connected to the assist motor 21 and arranged to adjust, or increase or decrease, the torque output of the assist motor 21 in response to actuating the actuator or actuator elements.

Further, in the second operating state, switched by the actuator switch, the remote control 3 and the actuators or actuator elements are operatively connected to the control motor 31 and arranged to adjust, or increase or decrease, transmission ratio main gearing 40 or the main epicyclic gear set 40.

Figure 16:
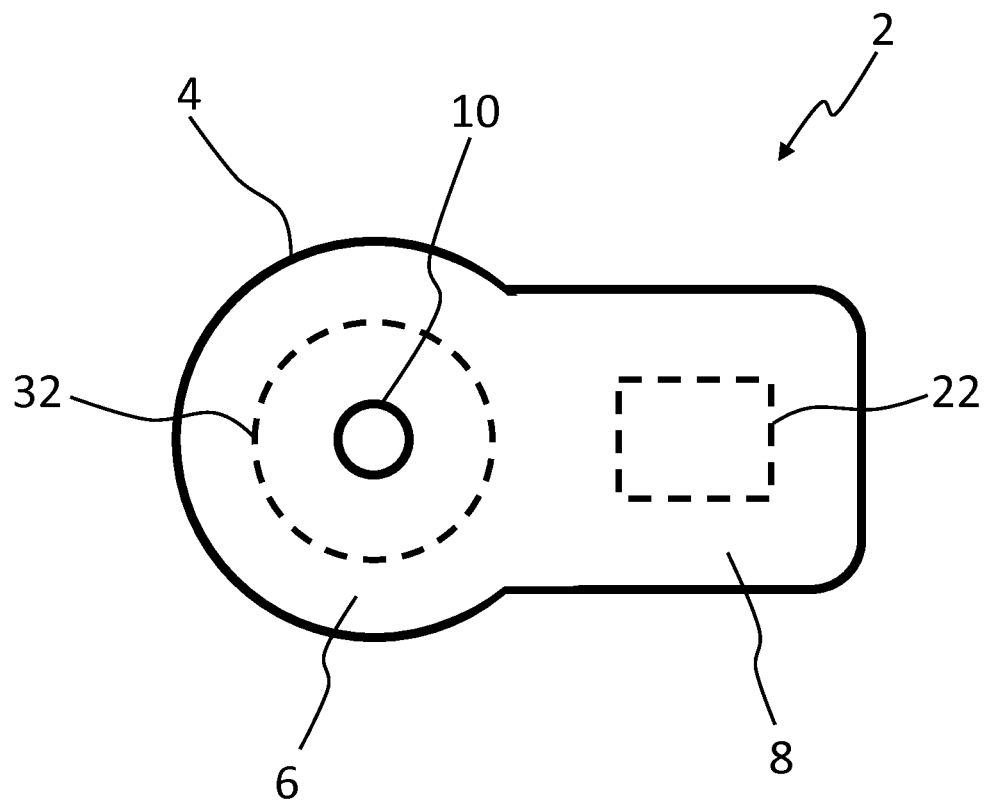

FIG. 16 shows an embodiment, in which the power unit 2 comprises the housing 4 accommodating the main epicyclic gear set 40, the assist motor 22 and the control motor 32. The housing 4 comprises the hub 6 arranged around the crankshaft 10 and the arm 8 extending from the hub 6. The assist motor 22 is arranged in the hub 6 and the control motor 32 is arranged in the arm 8.

It should be noted that mechanical structure and placement of the motors 21, 31 in the power unit 2 may be different.

Figure 17:
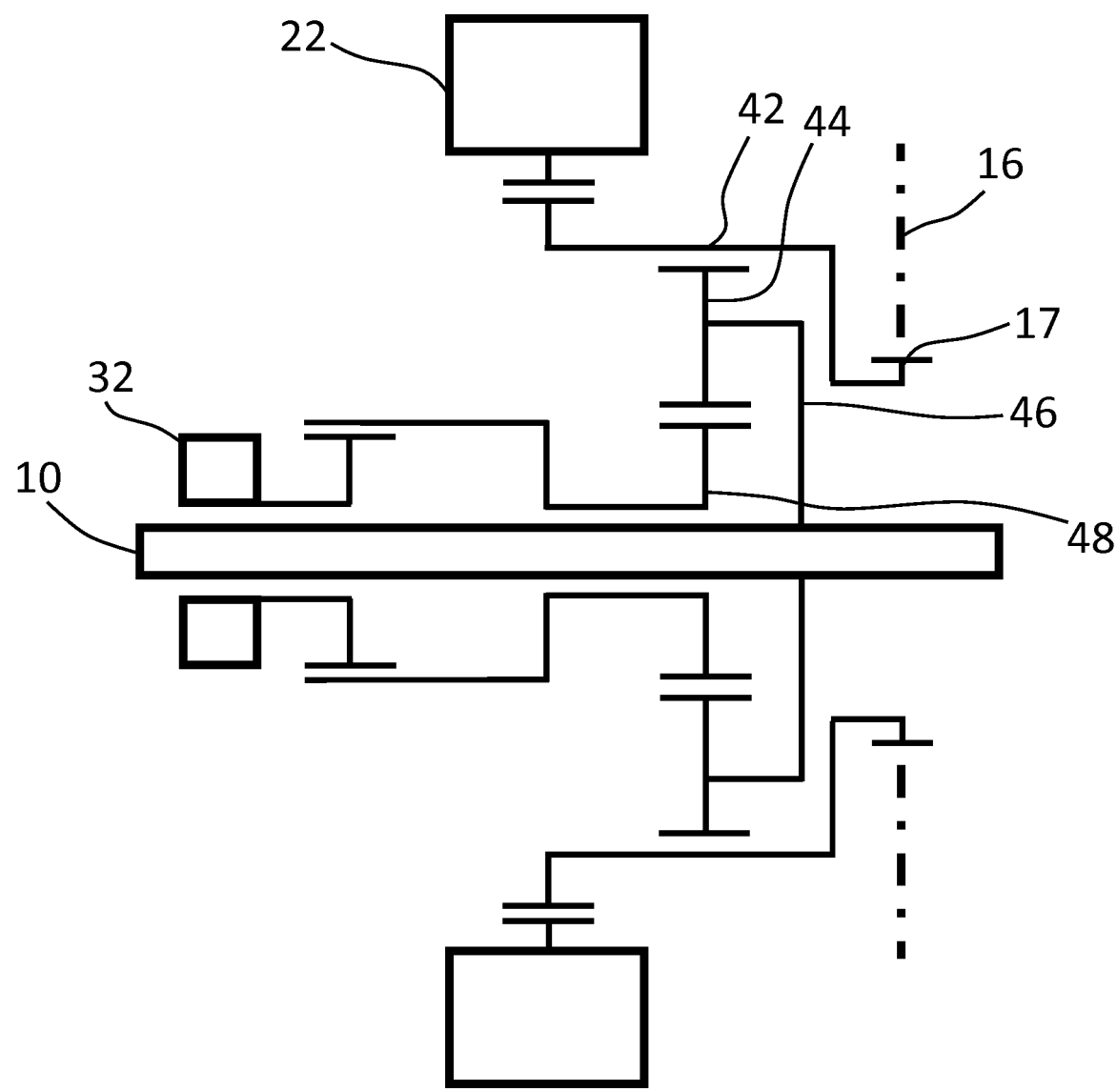

FIG. 17 further shows schematically the structure of the power unit of FIG. 16 together with the main epicyclic gear set 40 of FIG. 13. The crankshaft 10 is connected to the planet carrier 46 of the main epicyclic gear set 40 and the chainwheel 17 is connected to the ring gear 42. Further, the assist motor 22 is connected to the ring gear 42 of the epicyclic gear set 40 and the control motor 22 is connected to the sun gear 48 of the main epicyclic gear set 40.

Accordingly, in the first operating state, switched by the actuator switch, the remote control 3 and the actuators or actuator elements are operatively connected to the assist motor 22 and arranged to adjust, or increase or decrease, the torque output of the assist motor 22 in response to actuating the actuator or actuator elements.

Further, in the second operating state, switched by the actuator switch, the remote control 3 and the actuators or actuator elements are operatively connected to the control motor 32 and arranged to adjust, or increase or decrease, transmission ratio main gearing 40 or the main epicyclic gear set 40.

The invention has been described above with reference to the examples shown in the figures. However, the invention is in no way restricted to the above examples but may vary within the scope of the claims.

The invention claimed is:

1. A drive system for a light electric vehicle, the drive system comprising:
    a power unit for driving the light electric vehicle;
    a main gearing connected to the power unit for controlling a transmission ratio of the power unit; and
    a remote control connected to the power unit for operating the power unit, the remote control comprising an actuator arranged to operate the power unit, and
    the power unit comprising an assist motor arranged to provide torque output to a torsion shaft of the light electric vehicle, and a control motor arranged to adjust transmission ratio of the main gearing,
    wherein the remote control comprises:
    an operating switch arranged to switch the remote control between a first operating state and a second operating state, in the first operating state the actuator is connected to the assist motor and arranged to adjust the torque output of the assist motor, and in the second operating state the actuator is connected to the control motor and arranged to adjust the transmission ratio of the main gearing,
    wherein the main gearing comprises an epicyclic gear set comprising a sun gear, a ring gear, plurality of planet gears between the sun gear and the ring gear and a planet carrier connected to the planet gears and arranged to receive rotation of the torsion shaft, and that:
    the control motor is connected to the ring gear of the epicyclic gear set, the torsion shaft is connected to the sun gear of the epicyclic gear set, and the assist motor is connected to the sun gear of the epicyclic gear set; or the control motor is connected to the sun gear of the epicyclic gear set, the torsion shaft is connected to the planet carrier of the epicyclic gear set, and the assist motor is connected to the ring gear of the epicyclic gear set.

2. The drive system according to claim 1, wherein:
the remote control is wirelessly connected to the power unit; or
the remote control is connected to the power unit with a communication line.

3. The drive system according to claim 1, wherein the remote control comprises a control unit connected to the actuator and arranged to provide control signals as response to actuation of the actuator.

4. The drive system according to claim 1, wherein:
the actuator comprises a mechanical actuator element for actuating the actuator; or the actuator comprises an electronic actuator element for actuating the actuator.

5. The drive system according to claim 1, wherein the remote control comprises:
a main body provided with a control unit and the actuator is connected to the main body; or
a main body provided with the control unit and a separate actuator body connected to the main body; or
a main body provided with the control unit and a separate actuator body detachably connected to the main body.

6. The drive system according to claim 5, wherein:
the actuator element is provided to the separate actuator body, and the operating switch is provided to the main body; or
the actuator element is provided to the separate actuator body, and the operating switch and the control unit are provided to the main body; or
the actuator element is provided to the separate actuator body, and the operating switch is provided to the separate actuator body; or
the actuator element and the operating switch are provided to the separate actuator body, and the control unit is provided to the main body.

7. The drive system according to claim 1, wherein:
the operating switch comprises a first mode position in which the remote control is in the first operating state, and a second mode position in which the remote control is in the second operating state; or
the operating switch comprises a first switch element arranged to switch the operating switch in a first mode position in which the remote control is in the first operating state, and a second switch element arranged to switch the operating switch in a second mode position in which the remote control is in the second operating state.

8. The drive system according to claim 1, wherein:
the operating switch comprises a mechanical operating switch or the operating switch comprises an electronic operating switch.

* * * * *